United States Patent [19]

Blum

[11] Patent Number: 6,057,398
[45] Date of Patent: May 2, 2000

[54] AQUEOUS SUSPENSIONS OF MINERAL MATERIALS AND THEIR USES

[75] Inventor: Rene Vinzenz Blum, Urban, Switzerland

[73] Assignee: Pluess-Staufer AG, Oftringen, Switzerland

[21] Appl. No.: 09/119,016

[22] Filed: Jul. 20, 1998

[30] Foreign Application Priority Data

Jul. 18, 1997 [FR] France .................................. 97 09388

[51] Int. Cl.⁷ .............................. C08J 3/00; C08K 3/20; C08L 75/00; B05D 3/02; B05D 1/36
[52] U.S. Cl. .................... 524/507; 427/391; 427/411; 524/425; 524/445; 524/446; 524/447; 524/449; 524/451
[58] Field of Search ..................... 524/507, 425, 524/445, 446, 447, 449, 451; 427/411, 391

[56] References Cited

U.S. PATENT DOCUMENTS 3,567,503  3/1971  Fallwell et al. .

FOREIGN PATENT DOCUMENTS

| 0 011 806 | 6/1980 | European Pat. Off. . |
| 0 215 565 | 3/1987 | European Pat. Off. . |
| 0 412 027 | 2/1991 | European Pat. Off. . |
| 0 798 320 | 3/1996 | European Pat. Off. . |

*Primary Examiner*—Patrick D. Niland
*Attorney, Agent, or Firm*—Oblon, Spivak, McClelland, Maier & Neustadt, P.C.

[57] ABSTRACT

An aqueous suspension, comprising:

(1) water, (2) at least one mineral substance, and (3) a copolymer which comprises the following monomers in polymerized form:
  (a) at least one ethylenically unsaturated monomer having at least one carboxyl function,
  (b) optionally, at least one ethylenically unsaturated monomer having at least one sulphonyl function or phosphoryl function,
  (c) optionally, at least one ethylenically unsaturated monomer having no carboxyl function,
  (d) at least one ethylenically unsaturated oxyalkylated monomer terminating with a specified hydrophobic group, where the copolymer has a specific viscosity at most equal to 50. The suspension is useful in, for example, paper manufacturing and in the manufacture of coating colors for paper.

28 Claims, No Drawings

AQUEOUS SUSPENSIONS OF MINERAL MATERIALS AND THEIR USES

BACKGROUND OF THE INVENTION

1. Field of the Invention

The present invention relates to new aqueous suspensions of mineral fillers intended, for example, for the paper industry and the use thereof in the manufacture of paper and in the manufacture of coating color for paper.

2. Discussion of the Background

In practice, aqueous suspensions of mineral fillers, the rheology of which is such that it facilitates their use, are used as part of the process of manufacturing sheet paper and cardboard by mixing them with aqueous suspensions of cellulose fibers in order to improve the opacity, whiteness or printability of the paper produced.

They are also used in all applications during which the paper is coated, and are so in the form of aqueous compounds referred to as coating colors, essentially made up of water, binders and pigments or mineral fillers.

These pigments or mineral fillers, which may of various origins, have a different affinity to water depending on their nature. A first category consists of mineral substances with a charged hydrophilic surface such as natural or synthetic calcium carbonates, in particular chalks, calcites or marbles, the dolomites or alternatively kaolins as well as calcium sulphate or titanium oxides, satin white, aluminium hydroxides or others, for example. A second category covers mineral fillers with a hydrophobic surface such as talc, mica or others, for example.

Although these two types of mineral substances do not exhibit the same rheological behavior when placed in suspension in water, particularly when prepared in high concentrations, they must nevertheless exhibit the same quality criteria for the user. The aqueous suspensions of mineral substances must therefore possess a sufficiently yield stress to avoid all risk of sedimentation as well as a high enough but not too high Brookfield viscosity to prevent any hardening of particles of the mineral substances;, so that they will be easy for the user to handle even after storage in tanks for several days without agitation. Furthermore, these suspensions must have as high a content of mineral substance as possible in order to reduce all the costs inherent in transportation due to the quantity of water present.

Previously, suspensions of mineral substances with a charged hydrophilic surface have conventionally contained dispersing agents or crushing aids consisting of polyacrylates with a low molecular weight (EP 100 947, EP 542 643, EP 542 644). However, these agents have a disadvantage in that they are not very efficient when placing in suspension and/or crushing hydrophobic substances, such as talc or mica, which are commonly used alone or in mixtures. One skilled in the art currently uses suspensions of minerals with a hydrophobic surface containing other dispersing agents and/or crushing aids, these being copolymers in which one of the monomers has a surface-active structure (EP 0 003 235, EP 215 565). These copolymers, however, have a disadvantage in that they are not efficient when it comes to placing in suspension and/or crushing mineral substances with a hydrophilic surface such as the calcium carbonates or kaolins, calcium sulphate, titanium oxides, satin white, aluminium hydroxides or others.

Consequently, until now, in order to disperse and/or crush a mineral substance with a hydrophobic surface, it has been extremely difficult for the skilled person to use a dispersing and/or crushing agent known for its efficiency in dispersing and/or as an aid for crushing mineral substances with a hydrophilic surface and vice versa.

Faced with this problem of using dispersing agents and/or a crushing aid specific to a type of mineral substance, the applicant has conducted extensive research and has developed new suspensions of mineral pigment fillers which, irrespective of the nature of the mineral substance, have the same rheological properties and contain the same dispersing agent and/or crushing aid.

SUMMARY OF THE INVENTION

One of the objects of the present invention, therefore, is to obtain aqueous suspensions of mineral substances that are easy for the user to handle and can be used in the paper industry, regardless of whether these mineral substances have charged hydrophilic surfaces or hydrophobic surfaces.

Another object of the invention is the use of these aqueous suspensions of mineral fillers as proposed by the invention in the manufacture of paper and coating colors for paper.

The objects of the present invention, and others, may be accomplished by using as a dispersing agent and/or crushing aid a copolymer which contains the following monomers in polymerized form:

(a) at least one ethylenically unsaturated monomer having at least one carboxyl function, (b) optionally, at least one ethylenically unsaturated monomer having at least one sulphonic and/or phosphoric function, (c) optionally, at least one ethylenically unsaturated monomer which has no carboxyl function, and (d) at least one surface-active, oxyalkylated, ethylenically unsaturated monomer ending with a hydrophobic chain, the radical of which is selected with a view to using the copolymer as a dispersing agent and/or crushing aid regardless of the type of mineral substances to be dispersed and/or crushed.

Monomer (d) is represented by the formula:

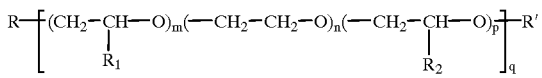

where m is at most 100, p is at most 100, n is at most 100, q is a number at least equal to 1 and such that $0 \leq q(n+m+p) \leq 100$, $R_1$ is hydrogen or a methyl or ethyl radical, $R_2$ is hydrogen or a methyl or ethyl radical.

R is a polymerizable unsaturated radical derived from an acrylic, methacrylic, maleic, itaconic, crotonic, or vinylphthalic ester or an unsaturated urethane, and R' is a hydrophobic radical.

Accordingly, the present invention provides for an aqueous suspension comprising water, at least one mineral substance, in addition to the copolymer described above.

A more complete appreciation of the invention and many of the attendant advantages thereof will be readily obtained as the same becomes better understood by reference to the following detailed description.

DETAILED DESCRIPTION OF THE INVENTION

In one embodiment, the aqueous suspensions of mineral substances of the invention, which meet the above-mentioned quality criterion, are characterized in that the copolymer, dispersing agent and/or crushing aid contains:

(a) at least one ethylenically unsaturated monomer having a carboxyl function, selected from among the mono-acids such as acrylic, methacrylic, crotonic, isocrotonic or cinnamic acid, the diacids such as itaconic, fumaric, maleic or citraconic acid, the anhydrides of carboxylic acids such as maleic anhydride and the hemi-esters of diacids such as the monoesters at $C_1$–$C_4$ of maleic or itaconic acids, or mixtures thereof, (b) optionally, at least one ethylenically unsaturated monomer having a sulphonic function, selected from among acrylamido-methyl propane-sulphonic acid, sodium methallylsulphonate, the vinyl sulphonic acids and styrene sulphonic acids, or having a phosphoric function selected from among ethylene glycol methacrylate phosphate, propylene glycol methacrylate phosphate, ethylene glycol acrylate phosphate, propylene glycol acrylate phosphate and their ethoxylates, or mixtures thereof, (c) optionally, at least one ethylenically unsaturated monomer having no carboxyl function, selected from the group comprising the esters of acrylic or methacrylic acids such as the methyl, ethyl, butyl, 2-ethyl-hexyl acrylates or methacrylates or acrylonitrile, methacrylonitrile, vinyl acetate, styrene, methylstyrene, diisobutylene, vinylpyrrolidone, vinylcaprolactam, or alternatively the unsaturated amides such as acrylamide, methacrylamide or their substituted derivatives such as, for example, dimethylaminopropyl acrylamide or methacrylamide, the acrylic or methacrylic esters of glycol, methacrylamido-propyl-trimethyl-ammonium chloride or sulphate, methacrylate of trimethylammonium-ethyl chloride or sulphate as well as their acrylate and quaternized acrylamide counterparts and/or dimethyldiallylammonium chloride, and (d) at least one ethylenically unsaturated oxyalkylated monomer terminating with a hydrophobic chain having the general formula (I):

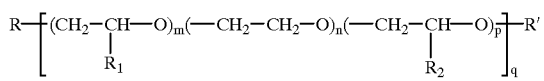

in which:

m and p represent a number of alkylene oxide units and are each, independently less than or equal to 100, n represents a number of ethylene oxide units and is less than or equal to 100, q is a number at least equal to 1 and such that:
$0 \leq q(n+m+p) \leq 100$, $R_1$ is hydrogen or a methyl or ethyl radical, $R_2$ is hydrogen or a methyl or ethyl radical.

R represents a polymerizable unsaturated radical derived from the group of acrylic, methacrylic, maleic, itaconic, crotonic, vinylphthalic esters as well as tie unsaturated urethanes such as, for example, acrylurethane, methacrylurethane, α-α'dimethyl-m-isopropenyl-benzylurethane, or allylurethane.

$R^1$ represents the hydrophobic radical such as a tristyrylphenyl group or the linear or branched alkyl, alkylaryl, arylalkyl, aryl groups having at least 8 carbon atoms or the dialkyl amines having at least 8 carbon atoms when R represents the unsaturated urethanes, or R' represents the hydrophobic radicals such as tristyrylphenyl as well as the linear or branched alkyl, alkylaryl, arylalkyl, aryl groups having more than 30 carbon atoms or dialkylamines having more than 22 carbon atoms when R represents the polymerizable unsaturated radical belonging to the group of acrylic, methacrylic, maleic, itaconic, crotonic, vinylphthalic esters. In the copolymer, the total weight of the constituents (a), (b), (c) and (d) is equal to 100% and the copolymer has a specific viscosity at most equal to 50 and preferably at most equal to 25.

In a more preferred embodiment, the aqueous suspension of mineral substances proposed by the invention contains a copolymer as a dispersing agent and/or crushing aid that contains:

(a) from 99 to 10% by weight, and even more particularly for reasons inherent in the polymerization process from 97% to 50% by weight, of at least one ethylenically unsaturated monomer having a carboxylic function, selected from among the mono-acids such as acrylic, methacrylic, crotonic, isocrotonic, cinnamic acid, the diacids such as itaconic, fumaric, maleic, citraconic acid, or the carboxylic acid anhydrides such as maleic anhydride and the hemi-esters of diacids such as the monoesters at $C_1$–$C_4$ of maleic or itaconic acids or mixtures thereof, (b) from 0 to 50% of at least one ethylenically unsaturated monomer having a sulphonic function selected from among acrylamido-methyl-propane-sulphonic acid, sodium methallylsulphonate, the vinyl sulphonic acids and styrene sulphonic acids, or having a phosphoric function selected from among ethylene glycol methacrylate phosphate, propylene glycol methacrylate phosphate, ethylene glycol acrylate phosphate, propylene glycol acrylate phosphate and their ethoxylates or mixtures thereof, (c) from 0% to 50% by weight of at least one ethylenically unsaturated monomer having no carboxylic function, selected from the group comprising the acrylic or methacrylic acid esters such as the methyl, ethyl, butyl, 2-ethyl-hexyl acrylates or methacrylates or acrylonitrile, vinyl acetate, styrene, methylstyrene, diisobutylene, vinylpyrrolidone, vinylcaprolactam, or the unsaturated amides such as acrylamide, methacrylamide or the unsaturated amides such as acrylamide, methacrylamide or their substituted derivatives, such as for example dimethylaminopropyl acrylamide or methacrylamide, the acrylic or methacrylic esters of glycol, methacrylamido-prodyltrimethyl ammonium chloride or sulphate, the methacrylate of trimethyl-ammonium-ethyl chloride or sulphate as well as their acrylate and quaternised acrylamide counterparts and/or dimethyldialylammonium chloride, (d) from 1% to 90% by weight, and even more particularly for reasons pertaining to the polymerization process, from 3% to 50% by weight of at least one ethylenically unsaturated oxyalkylated monomer terminating with a hydrophobic chain, of the general formula (I):

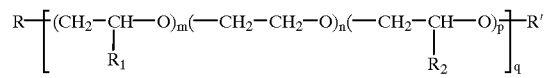

in which:

m and p represent a number of alkylene oxide units and is less than or equal to 100, n represents a number of ethylene oxide units and is less than or equal to 100, q is a number at least equal to 1 and such that: $0 \leq q(n+m+p) \leq 100$, $R_1$ is hydrogen or a methyl or ethyl radical, $R_2$ is hydrogen or a methyl or ethyl radical.

R represents a polymerizable unsaturated radical belonging to the group of acrylic, methacrylic, maleic, itaconic, crotonic, vinylphthalic esters as well as the unsaturated urethanes such as, for example, acrylurethane, methacrylurethane, α-α'dimethyl-m-isopropenyl-benzylurethane, allylurethane.

R' represents the hydrophobic radical such as tristyrylphenyl group or the linear or branched alkyl, alkylaryl, arylalkyl, aryl groups having at least 8 carbon atoms or the dialkyl amines having at least 8 carbon atoms when R represents the unsaturated urethanes or R' represents the hydrophobic radicals such as tristyrylphenyl as well as the linear or branched alkyl, alkylaryl, arylalkyl, aryl groups having more than 30 carbon atoms or dialkylamines having more than 22 carbon atoms when R represents the polymerizable unsaturated radical belonging to the group of acrylic, methacrylic, malic, itaconic, crotonic, vinylphthalic esters, where the sum of the weight percents monomers (a), (b), (c) and (d) in the polymer is equal to 100% and in that the copolymer has a specific viscosity at most equal to 50, and preferably at most equal to 25.

In monomer (d), the variables m and p represent the number of alkylene oxide units. These variables are each, independently, less than or equal to 100 (at most 100). The variables m and p may, independently, be 0, 1, 2, 5, 10, 15, 20, 25, 30 35, 40, 45, 50, 55, 60, 65, 75, 85, 90, 95, 97 and 99, inclusive of all specific values and subranges therebetween.

The variable n represents the number of ethylene oxide units and is less than or equal to 100 (i.e., at most 100). The variable n may be 0, 1, 2, 5, 10, 15, 20, 25, 30, 35, 40, 45, 50, 55, 60, 65, 75, 85, 90, 95, 97 and 99, inclusive of all specific values and subranges therebetween.

In the copolymer the amount of monomer (a) may be 10 to 99% by weight. This range includes all specific values and subranges therebetween, including 15, 20, 25, 30, 35, 40, 45, 50, 60, 65, 70, 75, 80, 85, 90, 95, 97 and 98% by weight.

The amount of monomer (b) in the copolymer may be 0 to 50% by weight. This range includes all specific values and subranges therebetween, including 0. 1, 0.2, 0.5, 1, 2, 5, 10, 15, 20, 25, 30, 35, 40 and 45% by weight.

The amount of monomer (c) in the copolymer may be 0 to 50% by weights This range includes all specific values and subranges therebetween, including 0.1, 0.2, 0.5, 1, 2, 5, 10, 15, 20, 25, 30, 35, 40 and 45% by weight.

The amount of monomer (c) in the copolymer may be 1 to 90% by weight. This range includes all specific values and subranges therebetween, including 2, 3. 5, 10, 15, 20, 25, 30, 35, 40, 45, 50, 60, 65, 70, 75, 80 and 85% by weight.

The copolymer may be obtained by known methods of radical copolymerization in solution, in direct or inverse emulsion, in suspension or precipitation in appropriate solvents in the presence of known catalytic systems and transfer agents, using well-known procedures.

This copolymer, obtained in acid form and possibly distilled, may be partially or totally neutralized by one or more neutralizing agents having a monovalent function or a polyvalent function such as, for example, those selected from the group comprising the alkaline cations, in particular sodium, potassium or ammonium or alternatively the primary, secondary or tertiary aliphatic and/or cyclic amines such as, for example, stearylamine, the ethanolamines (mono-, di-triethanolamine), mono- and diethyl amine, cyclohexylamine, methylcyclohexylamine or those selected from the group comprising the divalent alkaline earth cations, in particular magnesium and calcium or alternatively zinc, as well as the trivalent cations, including in particular aluminum, or alternatively certain cations with a higher valency. Each neutralizing agent is used in a quantity suited to the neutralization rates appropriate to each valency function. Once obtained, this copolymer can be used in the totally acid form or partially neutralized or fully neutralized.

In another variant, the copolymer produced by the copolymerization reaction may be treated and separated into several phases, either before or after the total or partial neutralization reaction, using the static or dynamic processes familiar to the person skilled in the art, by one or more polar solvents belonging in particular to the group comprising water, the alcohols such as methanol, ethanol, propanol, isopropanol, the butanols, the ketones, such as, in particular, acetone, methyl-ethyl ketone, cyclohexanone or alternatively tetrahydrofuran, dimethylsulphoxide or mixtures thereof.

One of the phases then corresponds to the copolymer contained in the aqueous suspension of mineral substances as proposed by the invention.

The specific viscosity of the copolymer is symbolized by the letter "η" and is determined in the following way:

A polymer solution is made up to obtain a solution corresponding to 2.5 g of dry polymer neutralized with soda and 50 ml of a bipermutated water solution. Using a capillary viscometer with a Baume constant equal to 0.000105 placed in a bath thermostatically controlled to 25° C., a measurement is taken of the flow time of a giver volume of the above-mentioned solution containing the polymer as well as the flow time of the same solution of bipermutated water without the said copolymer. It will then be possible to define the specific viscosity "η" by means of the following equation:

$$"\eta" = \frac{\text{(flow time of the polymer solution)} - \text{(flow time of the permutated water solution)}}{\text{flow time of the permutated water solution}}$$

The capillary tube is generally selected so that the flow time of the permutated water solution without the copolymer is approximately 90 to 100 seconds, thus giving highly accurate specific viscosity readings.

The mineral substances (e.g., mineral fillers) used in the invention are of very diverse origins and can be classified in two general categories.

The first category is made up of mineral substances with a charged hydrophilic surface such as the natural or synthetic calcium carbonates, for example, particularly chalks, calcites, marbles or dolomites or alternatively the kaolins, calcium sulphate, titanium oxides or satin white or aluminum hydroxides or any other mineral with a hydrophilic surface. The second category includes mineral fillers with a hydrophobic surface such as, for example, talc, mica and any other mineral with a hydrophobic surface.

Apart from the copolymer used as a dispersing agent and/or crushing aid, this aqueous suspension of mineral substances is characterized in that said mineral substance or substances are selected either from the mineral substances with a charged hydrophilic surface such as the natural or synthetic calcium carbonates, in particular chalk, calcite, marble or dolomite or the kaolins, calcium sulphate, titanium oxides or mixtures thereof, or are selected from the mineral substances with a hydrophobic surface such as, talc or mica or mixtures thereof in particular, or alternatively a mixture of mineral fillers with a hydrophilic surface and mineral fillers with a hydrophobic surface.

In practice, one way of dispersing the mineral substance or substances to be dispersed consists in preparing, under agitation, an aqueous solution of the dispersing agent proposed by the invention to which the mineral substance or substances to be dispersed are added.

For the purposes of the invention, the dispersing agent is introduced in a quantity of from 0.05% to 5% by weight of the dried fraction of said polymers relative to the dry weight of the mineral substance or substances to be refined. This weight range includes all specific values and subranges therebetween, including 0.1, 0.2, 0.5, 1, 2, 3 and 4% by weight.

Similarly, in practice, the operation of crushing the mineral substance or substances to be refined consists in crushing the mineral substance or substances with a crushing medium in very fine particles in an aqueous medium containing the crushing agent. An aqueous suspension of the mineral substance or substances to be crushed is then formed.

The crushing medium added to the suspension of the mineral substance or substances to be crushed advantageously has a grain size of between 0.20 and 4 millimeters. The crushing medium is generally present in the form of particles of substances as diverse as silicon oxide, aluminum oxide, zirconium oxide or mixtures thereof as well as the very hard synthetic resins, steels or others. An example of a composition for such crushing media is given in patent FR 2 303 681, incorporated herein by reference, which describes crushing media made up of 30 to 70% by weight of zirconium oxide, 0.1 to 5% of aluminum oxide and from 5 to 20% of silicon oxide. By preference, the crushing medium is added to the suspension in a quantity such that the ratio by weight of this crushing medium to the mineral substance or substances to be crushed is at least 2/1, this ratio preferably being within the ranges of 3/1 and 5/1.

The mixture of the suspension and the crushing medium is then subjected to mechanical agitation, such as that produced in a conventional crusher with micro-elements.

In accordance with the invention, the dispersing agent and/or crushing aid is also introduced to the mixture comprising the aqueous suspension of mineral substances and the crushing medium in a quantity of 0.05% to 5% by weight of the dried fraction of said polymers relative to the dry weight of the mineral substance or substances to be refined.

The time needed to produce an excellent fineness of the mineral substances after crushing will depend on the nature and quantity of the mineral substances to be crushed as well as on the agitation method used and the ambient temperature during the crushing operation.

If the mineral substance or substances are one or more mineral substances with a hydrophilic surface, the aqueous suspension of mineral substances proposed by the invention will also have a high yield stress as well as a low Brookfield viscosity with high contents of dry substance, i.e., at least 45% and preferably at least 60%.

If the mineral substance or substances are one or more mineral substances with a hydrophobic surface, the aqueous suspension of mineral substances proposed by the invention will have a high yield stress and a low Brookfield viscosity with high contents of dry substance, i.e., at least 45% and preferably at least 60%.

Similarly, if the mineral substances are a mixture of mineral substances with a hydrophilic surface and mineral substances with a hydrophobic surface, the aqueous suspension of mineral substances proposed by the invention will have a high yield stress and a low Brookfield viscosity with high contents of dry substance, i.e., at least 45% and preferably at least 60%.

The particle size of the mineral substance in the suspension is such that 90% of the particles have a diameter of less than 2 micrometers.

The suspension preferably contains at least 5% by weight of the mineral substance(s). The suspension may contain, for example, at least 10, 15, 20, 25, 30, 35, 40, 45, 50, 55, 60, 70, 80 and 85% by weight, inclusive of all specific values and subranges therebetween.

The above-mentioned Theological properties of the aqueous suspensions of mineral substances proposed by the invention make them suitable for use in the paper industry, particularly as a mass filler for paper or as an essential component in coating colors.

The coating colours of the invention are prepared in a manner known to the person skilled in the art by mixing suspensions of mineral fillers of the invention with water and one or more binders of natural or synthetic origin such as, for example, starch, carboxymethyl cellulose, the polyvinyl alcohols or alternatively latex of the styrene butadiene or styrene acrylate type or alternatively latex of the acrylic, vinyl or other types.

The coating colours can contain, in a manner known to the person skilled in the art, usual additives such as rheology modifiers, organic fillers, antifoam agents, optical brighteners, biocides, lubricarts, alkaline hydroxides and others.

The scale of importance of the invention will be more readily appreciated from the following examples, which are not restrictive in any respect, particularly in terms of the order in which the various constituents are introduced to the suspensions.

EXAMPLE 1

This example relates to the preparation of aqueous suspensions of calcium carbonate.

To this end, for each of the tests, conducted using a marble from the Gummern deposit (Austria) with a grain size such that 90% of the particles are of a diameter of less than 2 micrometers, a quantity of said marble necessary to produce a suspension with a 65% concentration of dry substance is introduced into a two-liter beaker containing water. This beaker also contains a quantity of copolymer to be tested corresponding to 0.5% by weight of dry copolymer relative to the total weight of dry substance present in the suspension.

After agitating for 20 minutes, a measurement is taken, at ambient temperature, of the Brookfield viscosity suing a Brookfield viscometer of the RVT type at 10 revolutions per minute (r/min) and 100 r/min using the appropriate spindle.

Test N° 1

This test, illustrating the prior art, uses a sodium polyacrylate with a specific viscosity of 0.45.

Test N° 2

This test, illustrating the prior art, uses a mixture consisting of 25 parts by weight of a sodium polyacrylate with a specific viscosity of 0.45 and 75 parts by weight of an alkylene polyoxide marketed under the name of Pluronic PE 4300 by BASF.

Test N° 3

This test, illustrating the invention, uses a polymer 100% neutralised by soda having a specific viscosity of 4.35 and made up, by percentage weight, of:

90% of acrylic acid

10% of tristyryl phenol methacrylate ethoxylated with 25 moles of ethylene oxide.

Test N° 4

This test, illustrating the invention, uses a polymer 100% neutralised by soda having a specific viscosity of 4.38 and made up, by percentage weight, of:

90% of acrylic acid

10% of tristyryl phenol methacrylate ethoxylated with 40 moles of ethylene oxide.

Test N° 5

This test, illustrating the invention, uses a polymer 100% neutralised by soda having a specific viscosity of 4.43 and made up, by percentage weight, of:
- 90% of acrylic acid
- 10% of tristyryl phenol methacrylate ethoxylated with 60 moles of ethylene oxide.

Test No 6

This test, illustrating the invention, uses a polymer 100% neutralised by soda having a specific viscosity of 2.54 and made up, by percentage weight, of:
- 95% of acrylic acid
- 5% of methacrylurethane of the general formula (I) in which the hydrophobic radical R' is a linear alkyl group with 22 carbon atoms, m and p are equal to 0, q=1 and n=25.

Test N° 7

This test, illustrating the invention, uses a polymer 100% neutralised by soda having a specific viscosity of 1.52 and made up, by percentage weight, of:
- 95% of acrylic acid
- 5% of methacrylate of the general formula (I) in which the hydrophobic radical R' is a —N—(R"R"') group where R" and R"' are linear alkyl chains with 12 carbon atoms, m and p are equal to 0, q=1 and n=50.

Test N° 8

This test, illustrating the invention, uses a polymer 100% neutralised by soda having a specific viscosity of 2.47 and made up, by percentage weight, of:
- 95% of acrylic acid
- 5% of methacrylurethane of the general formula (I) in which the hydrophobic radical R' is a branched alkyl group with 28 carbon atoms, m and p are equal to 0, q=1 and n=25.

Test N° 9

This test, illustrating the invention, uses a polymer 100% neutralised by soda having a specific viscosity of 1.79 and made up, by percentage weight, of:
- 95% of acrylic acid
- 5% of methacrylurethane of the general formula (I) in which the hydrophobic radical R' is a branched alkyl group with 30 carbon atoms, m and p are equal to 0, q=1 and n=25.

Test N° 10

This test, illustrating the invention, uses a polymer 100% neutralised by soda having a specific viscosity of 2.59 and made up, by percentage weight, of:
- 90% of acrylic acid
- 10% of methacrylate of the general formula (I) in which the hydrophobic radical R' is a branched alkyl group with 32 carbon atoms, m and p are equal to 0, q=1 and n=25.

Test N° 11

This test, illustrating the invention, uses a polymer 100% neutralised by soda having a specific viscosity of 5.49 and made up, by percentage weight, of:
- 80% of acrylic acid
- 2% of ethyl acrylate
- 8% of methacrylic acid
- 10% of methacrylurethane of the general formula (I) in which the hydrophobic radical R' is a tristyrylphenyl radical, m and p are equal to 0, q=1 and n=25.

Test N° 12

This test, illustrating the invention, uses a polymer 100% neutralised by soda having a specific viscosity of 3.02 and made up, by percentage weight, of:
- 97% of acrylic acid
- 3% of tristyryl phenol methacrylate ethoxylated with 25 moles of ethylene oxide.

Test N° 13

This test, illustrating the invention, uses a polymer 100% neutralised by soda having a specific viscosity of 3.94 and made up, by percentage weight, of:
- 93% of acrylic acid
- 7% of tristyryl phenol methacrylate ethoxylated with 25 moles of ethylene oxide.

Test N° 14

This test, illustrating the invention, uses a polymer 100% neutralised by soda having a specific viscosity of 3.74 and made up, by percentage weight, of:
- 85% of acrylic acid
- 15% of tristyryl phenol methacrylate ethoxylated with 25 moles of ethylene oxide.

Test N° 15

This test, illustrating the invention, uses a polymer 100% neutralised by soda having a specific viscosity of 7.53 and made up, by percentage weight, of:
- 85% of acrylic acid
- 5% of methacrylic acid
- 10% of tristyryl phenol methacrylate ethoxylated with 25 moles of ethylene oxide.

Test N° 16

This test, illustrating the invention, uses a polymer 100% neutralised by soda having a specific viscosity of 5.58 and made up, by percentage weight, of:
- 85% of acrylic acid
- 5% of itaconic acid
- 10% of tristyryl phenol methacrylate ethoxylated with 25 moles of ethylene oxide.

Test N° 17

This test, illustrating the invention, uses a polymer 100% neutralised by soda having a specific viscosity of 7.16 and made up, by percentage weight, of:
- 85% of acrylic acid
- 5% of maleic acid
- 10% of tristyryl phenol methacrylate ethoxylated with 25 moles of ethylene oxide.

Test N° 18

This test, illustrating the invention, uses a polymer 100% neutralised by soda having a specific viscosity of 6.68 and made up, by percentage weight, of:
- 85% of acrylic acid
- 5% of acrylamido-methyl-propane-sulphonic acid
- 10% of tristyryl phenol methacrylate ethoxylated with 25 moles of ethylene oxide.

Test N° 19

This test, illustrating the invention, uses a polymer 100% neutralised by soda having a specific viscosity of 4.38 and made up, by percentage weight, of:
- 85% of acrylic acid
- 5% of acrylamide
- 10% of tristyryl phenol methacrylate ethoxylated with 25 moles of ethylene oxide.

Test N° 20

This test, illustrating the invention, uses a polymer 100% neutralised by soda having a specific viscosity of 5.71 and made up, by percentage weight, of:
- 85% of acrylic acid
- 5% of ethylene glycol methacrylate phosphate
- 10% of tristyryl phenol methacrylate ethoxylated with 25 moles of ethylene oxide.

Test N° 21

This test, illustrating the invention, uses a polymer 100% neutralised by soda having a specific viscosity of 5.49 and made up, by percentage weight, of:
- 80% of acrylic acid
- 2% of ethyl acrylate
- 8% of methacrylic acid
- 10% of methacrylurethane of general formula (I) in which the hydrophobic radical R' is a tristyrylphenyl radical, m and p are equal to 0, q=1 and n=25.

Test N° 22

This test, illustrating the invention, uses a polymer 100% neutralised by soda having a specific viscosity of 0.67 and made up, by percentage weight, of:

95% of acrylic acid

5% of tristyryl phenol methacrylate ethoxylated with 25 moles of ethylene oxide.

Test N° 23

This test, illustrating the invention, uses a polymer 100% neutralised by soda having a specific viscosity of 1.94 and made up, by percentage weight, of:

90% of acrylic acid

10% of tristyryl phenol methacrylate ethoxylated with 25 moles of ethylene oxide.

Test N° 24

This test, illustrating the invention, uses a polymer 100% neutralised by soda having a specific viscosity of 2.66 and made up, by percentage weight, of:

90% of acrylic acid

10% of tristyryl phenol methacrylate ethoxylated with 25 moles of ethylene oxide.

Test N° 25

This test, illustrating the invention, uses a polymer 100% neutralised by soda having a specific viscosity of 12.04 and made up, by percentage weight, of:

90% of acrylic acid

10% of tristyryl phenol methacrylate ethoxylated with 25 moles of ethylene oxide.

Test N° 26

This test, illustrating the invention, uses a polymer 70% neutralised by soda having a specific viscosity of 4.35 and made up, by percentage weight, of:

90% of acrylic acid

10% of tristyryl phenol methacrylate ethoxylated with 25 moles of ethylene oxide.

The results of all these experiments are set out in table 1 below.

TABLE 1

| | Test No | Brookfield viscosity of the suspension in mPa · s | |
|---|---|---|---|
| | | 10 r/min | 100 r/min |
| Prior art | 1 | 2000 | 350 |
| Prior art | 2 | 24000 | 6200 |
| Invention | 3 | 800 | 210 |
| Invention | 4 | 1000 | 225 |
| Invention | 5 | 1900 | 320 |
| Invention | 6 | 1290 | 270 |
| Invention | 7 | 1400 | 260 |
| Invention | 8 | 840 | 210 |
| Invention | 9 | 1040 | 230 |
| Invention | 10 | 1150 | 230 |
| Invention | 11 | 750 | 210 |
| Invention | 11 | 1250 | 270 |
| Invention | 13 | 1100 | 230 |
| Invention | 14 | 950 | 230 |
| Invention | 15 | 600 | 180 |
| Invention | 16 | 600 | 175 |
| Invention | 17 | 700 | 215 |
| Invention | 18 | 800 | 230 |
| Invention | 19 | 1100 | 290 |
| Invention | 20 | 600 | 185 |
| Invention | 21 | 750 | 210 |
| Invention | 22 | 1850 | 325 |
| Invention | 23 | 1000 | 215 |
| Invention | 24 | 1100 | 290 |
| Invention | 25 | 650 | 215 |
| Invention | 26 | 190 | 110 |

Table 1 highlights the fact that by applying the invention, aqueous suspensions of calcium carbonate with low Brookfield viscosities are obtained.

It is also obvious from reading the table that using a polyacrylate in conjunction with an alkylene polyoxide, a formula currently used to place mineral substances with a hydrophobic surface in suspension, does not produce calcium carbonate suspensions with a low Brookfield viscosity.

EXAMPLE 2

This example illustrates the invention and involves preparing an aqueous suspension of calcium carbonate with a content of dry substance equal to 45%.

To this end, for the purposes of test N° 27 below, conducted using a marble from the Gummern deposit (Austria) in which the grain size is such that 90% of the particles are of a diameter of less than 2 micrometers, a quantity of said marble necessary to obtain a suspension with a 45% concentration of dry substance is added, by pouring and under agitation, to a two-liter beaker containing water. This beaker also contains a quantity of copolymer to be tested corresponding to 0.23% by weight of dry copolymer relative to the total weight of dry substance present in the suspension.

The copolymer used is a polymer neutralised 75% by soda and the product of a fractionation process, having a specific viscosity of 4.35 and made up, by percentage weight, of:

90% of acrylic acid

10% of tristyryl phenol methacrylate ethoxylated with 25 moles of ethylene oxide.

After 20 minutes of agitation, the Brookfield viscosities are measured, at ambient temperature, using a Brookfield viscometer of the RVT type at 10 revolutions per minute (r/min) and 100 r/min using the appropriate spindle.

These viscosities are respectively 790 mpa.s and 110 mpa.s.

EXAMPLE 3

This example also involves preparing aqueous suspensions of calcium carbonate but with a coarser grain size.

To this end, for each of the following tests conducted on a marble from a Norwegian deposit in which the grain size is such that 60% of the particles are of a diameter of less than 2 micrometers, a quantity of said marble necessary to obtain a suspension with a 75% concentration of dry substance is added, by pouring and under agitation, to a two-liter beaker containing water. This beaker also contains a quantity of copolymer to be tested corresponding to 0.5% by weight of dry copolymer relative to the total weight of dry substance present in the suspension.

After 20 minutes of agitation, the Brookfield viscosities (T0) are measured, at ambient temperature, using a Brookfield viscometer of the DVII type at 100 r/min using the appropriate spindle.

The Brookfield viscosities are also determined after 24 hours, 2 days, 3 days and one week of storage without agitation.

Once a reading had been taken of the Brookfield viscosity before agitation (viscosity AVAG) after 7 days of storage, the sample was agitated in order to ascertain the Brookfield viscosity after agitation (viscosity APAG).

Furthermore, these samples were diluted to 72% and stored for 7 days without agitation in order to see whether there was any sedimentation by inserting a spatula down to the base of the flask.

Test N° 28

This test, illustrating the prior art, uses a sodium polyacrylate with a specific viscosity of 0.45.

Test N° 29

This test, illustrating the invention, uses a polymer 100% neutralised by soda having a specific viscosity of 1.94 and made up, by percentage weight, of:

90% of acrylic acid

10% of tristyryl phenol methacrylate ethoxylated with 25 moles of ethylene oxide.

Test N° 30

This test, illustrating the invention, uses a polymer 100% neutralised by soda having a specific viscosity of 3.02 and made up, by percentage weight, of:

97% of acrylic acid

3% of tristyryl phenol methacrylate ethoxylated with 25 moles of ethylene oxide.

Test N° 31

This test, illustrating the invention, uses a polymer 100% neutralised by soda having a specific viscosity of 4.38 and made up, by percentage weight, of:

85% of acrylic acid

5% acrylamide

10% of tristyryl phenol methacrylate ethoxylated with 25 moles of ethylene oxide.

Test N° 32

This test, illustrating the invention, uses a polymer 100% neutralised by soda having a specific viscosity of 5.49 and made up, by percentage weight, of:

80% of acrylic acid

2% of ethyl acrylate

8% methacrylic acid

10% of methacrylurethane, of the general formula (I), in which the hydrophobic radical R' is a tristyrylphenyl radical, m and p are equal to 0, q=1 and n 25.

The results of all these tests are set out in table 2 below.

It can not be placed in suspension due to the fact that the agitator becomes blocked due to a too high viscosity.

Test N° 34

This test, illustrating the prior art, uses a mixture consisting of 25 parts by weight of a sodium polyacrylate having a specific viscosity of 0.45 and 75 parts by weight of an alkylene polyoxide marketed under the name of Pluronic PE 4300 by BASF.

Test N° 35

This test, illustrating the invention, uses a polymer which, after 100% neutralisation by soda, is a polymer with a specific viscosity of 7.5 and is made up, by percentage weight, of:

90% of acrylic acid

10% of tristyryl phenol methacrylate ethoxylated with 16 moles of ethylene oxide.

Test N° 36

This test, illustrating the invention, uses a polymer which, after 100% neutralisation by soda , is a polymer with a specific viscosity of 4.0 and is made up, by percentage weight, of:

90% of acrylic acid

10% of tristyryl phenol methacrylate ethoxylated with 8 moles of ethylene oxide and oxypropylated with 13 moles of propylene oxide.

Test N° 37

This test, illustrating the invention, uses a polymer which, after 100% neutralisation by soda, is a polymer which has a specific viscosity of 4.35 and is made up, by percentage weight, of:

90% of acrylic acid

10% of tristyryl phenol methacrylate ethoxylated with 25 moles of ethylene oxide.

TABLE 2

|  | Test No. | T0 | Brookfield viscosity in mPa · s at 100 r/min |  |  |  |  | Sedimentation |
|---|---|---|---|---|---|---|---|---|
|  |  |  | 24 hours AVAG | 2 days AVAG | 3 days AVAG | 7 days AVAG | 7 days APAG |  |
| Prior art | 28 | 1650 | 1070 | 1200 | 1375 | 1760 | 1790 | NO |
| Invention | 29 | 268 | 431 | 451 | 450 | 508 | 301 | NO |
| Invention | 30 | 309 | 594 | 622 | 616 | 641 | 309 | NO |
| Invention | 31 | 551 | 710 | 754 | 726 | 759 | 509 | NO |
| Invention | 32 | 526 | 769 | 809 | 818 | 849 | 512 | NO |

Table 2 highlights the fact that aqueous suspensions of calcium carbonate can be obtained which have low Brookfield viscosities, are stable over time and do not exhibit any tendency towards sedimentation in spite of the fact that the grain size of the constituent particles is not as fine.

EXAMPLE 4

This example relates to the preparation of aqueous suspensions of talc.

To this end and using the same operating method apart from the duration of agitation which is 45 minutes and using the same equipment as that used in example 1, talc, Finntalc C10 sold by Finnminerals, is mixed with a quantity of water necessary to produce a suspension with a 65% concentration of dry substance and a quantity of fully neutralised polymer to be tested corresponding to 2.0% by dry weight of dry acid copolymer relative to the total weight of dry substance present in the suspension.

Test N° 33

This test, illustrating the prior art, uses a sodium polyacrylate with a specific viscosity of 0.45.

Test N° 38

This test, illustrating the invention, uses a polymer which, after 100% neutralisation by soda, is a polymer which has a specific viscosity of 4.38 and is made up, by percentage weight, of:

90% of acrylic acid

10% of tristyryl phenol methacrylate ethoxylated with 40 moles of ethylene oxide.

Test N° 39

This test, illustrating the invention, uses a polymer which, after 100% neutralisation by soda, is a polymer which has a specific viscosity of 4.43 and is made up, by percentage weight, of:

90% of acrylic acid

10% of tristyryl phenol methacrylate ethoxylated with 60 moles of ethylene oxide.

Test N° 40

This test, illustrating the invention, uses a polymer which, after 100% neutralisation by soda, is a polymer which has a specific viscosity of 2.59 and is made up, by percentage weight, of:

90% of acrylic acid

10% of methacrylate of general formula (I) in which the hydrophobic radical R' is a branched alkyl group with 32 carbon atoms, m and p are equal to 0, q=1 and n=25.

Test N° 41

This test, illustrating the invention, uses a polymer which, after 100% neutralisation by soda, is a polymer which has a specific viscosity of 5.49 and is made up, by percentage weight, of:

80% of acrylic acid
2% of ethyl acrylate
8% of methacrylic acid
10% of methacrylurethane of general formula (I) in which the hydrophobic radical R' is a tristyrylphenyl radical, m and p are equal to 0, q=1 and n=25.

Test N° 42

This test, illustrating the invention, uses a polymer which, after 100% neutralisation by soda, is a polymer which has a specific viscosity of 3.02 and is made up, by percentage weight, of:

97% of acrylic acid
3% of tristyryl phenol methacrylate ethoxylated with 25 moles of ethylene oxide.

Test N° 43

This test, illustrating the invention, uses a polymer which, after 100% neutralisation by soda, is a polymer which has a specific viscosity of 3.31 and is made up, by percentage weight, of:

95% of acrylic acid
5% of tristyryl phenol methacrylate ethoxylated with 25 moles of ethylene oxide.

Test N° 44

This test, illustrating the invention, uses a polymer which, after 100% neutralisation by soda, is a polymer which has a specific viscosity of 3.94 and is made up, by percentage weight, of:

93% of acrylic acid
7% of tristyryl phenol methacrylate ethoxylated with 25 moles of ethylene oxide.

Test N° 45

This test, illustrating the invention, uses a polymer which, after 100% neutralisation by soda, is a polymer which has a specific viscosity of 3.74 and is made up, by percentage weight, of:

85% of acrylic acid
15% of tristyryl phenol methacrylate ethoxylated with 25 moles of ethylene oxide.

Test No 46

This test, illustrating the invention, uses a polymer which, after 100% neutralisation by soda, is a polymer which has a specific viscosity of 7.53 and is made up, by percentage weight, of:

85% of acrylic acid
5% of methacrylic acid
10% of tristyryl phenol methacrylate ethoxylated with 25 moles of ethylene oxide.

Test N° 47

This test, illustrating the invention, uses a polymer which, after 100% neutralisation by soda, is a polymer which has a specific viscosity of 5.58 and is made up, by percentage weight, of:

85% of acrylic acid
5% of itaconic acid
10% of tristyryl phenol methacrylate ethoxylated with 25 moles of ethylene oxide.

Test N° 48

This test, illustrating the invention, uses a polymer which, after 100% neutralisation by soda, is a polymer which has a specific viscosity of 7.16 and is made up, by percentage weight, of:

85% of acrylic acid
5% of maleic acid
10% of tristyryl phenol methacrylate ethoxylated with 25 moles of ethylene oxide.

Test N° 49

This test, illustrating the invention, uses a polymer which, after 100% neutralisation by soda, is a polymer which has a specific viscosity of 6.68 and is made up, by percentage weight, of:

85% of acrylic acid
5% of acrylamido-methyl-propane-sulphonic acid
10% of tristyryl phenol methacrylate ethoxylated with 25 moles of ethylene oxide.

Test N° 50

This test, illustrating the invention, uses a polymer which, after 100% neutralisation by soda, is a polymer which has a specific viscosity of 4.38 and is made up, by percentage weight, of:

85% of acrylic acid
5% of acrylamide
10% of tristyryl phenol methacrylate ethoxylated with 25 moles of ethylene oxide.

Test N° 51

This test, illustrating the invention, uses a polymer which, after 100% neutralisation by soda, is a polymer which has a specific viscosity of 5.71 and is made up, by percentage weight, of:

85% of acrylic acid
5% of ethylene glycol methacrylate phosphate
10% of tristyryl phenol methacrylate ethoxylated with 25 moles of ethylene oxide.

Test N° 52

This test, illustrating the invention, uses a polymer which, after 100% neutralisation by soda, is a polymer which has a specific viscosity of 5.49 and is made up, by percentage weight, of:

80% of acrylic acid
2% of ethyl acrylate
8% of methacrylic acid
10% of methacrylurethane of the general formula (I) in which the hydrophobic radical R' is a tristyrylphenyl radical, m and p are equal to 0, q=1 and n=25.

Test N° 53

This test, illustrating the invention, uses a polymer which, after 100% neutralisation by soda, is a polymer which has a specific viscosity of 1.94 and is made up, by percentage weight, of:

90% of acrylic acid
10% of tristyryl phenol methacrylate ethoxylated with 25 moles of ethylene oxide.

Test N° 54

This test, illustrating the invention, uses a polymer which, after 100% neutralisation by soda, is a polymer which has a specific viscosity of 2.66 and is made up, by percentage weight, of:

90% of acrylic acid
10% of tristyryl phenol methacrylate ethoxylated with 25 moles of ethylene oxide.

Test N° 55

This test, illustrating the invention, uses a polymer which, after 100% neutralisation by soda, is a polymer which has a specific viscosity of 3.38 and is made up, by percentage weight, of:

90% of acrylic acid
10% of tristyryl phenol methacrylate ethoxylated with 25 moles of ethylene oxide.

Test N° 56

This test, illustrating the invention, uses a polymer which, after 100% neutralisation by soda, is a polymer which has a specific viscosity of 12.04 and is made up, by percentage weight, of:

90% of acrylic acid

10% of tristyryl phenol methacrylate ethoxylated with 25 moles of ethylene oxide.

Test N° 57

This test, illustrating the invention, uses a polymer neutralised, in molar percentage, 75% by soda and 25% by lime, having a specific viscosity of 4.35 and made up, by percentage weight, of:

90% of acrylic acid

10% of tristyryl phenol methacrylate ethoxylated with 25 moles of ethylene oxide.

Test N° 58

This test, illustrating the invention, uses a polymer neutralised, in molar percentage, 50% by soda and 50% by lime, having a specific viscosity of 4.35 and made up, by percentage weight, of:

90% of acrylic acid

10% of tristyryl phenol methacrylate ethoxylated with 25 moles of ethylene oxide.

Test N° 59

This test, illustrating the invention, uses a polymer neutralised, in molar percentage, 25% by soda and 75% by lime having a specific viscosity of 4.35 and made up, by percentage weight, of:

90% of acrylic acid

10% of tristyryl phenol methacrylate ethoxylated with 25 moles of ethylene oxide.

Test N° 60

This test, illustrating the invention, uses a polymer neutralised, in molar percentage, 75% by soda and 25% by magnesium hydroxide, having a specific viscosity of 4.35 and made up, by percentage weight, of:

90% of acrylic acid

10% of tristyryl phenol methacrylate ethoxylated with 25 moles of ethylene oxide.

Test N° 61

This test, illustrating the invention, uses a polymer neutralised 100% by potash, having a specific viscosity of 4.35 and made up, by percentage weight, of:

90% of acrylic acid

10% of tristyryl phenol methacrylate ethoxylated with 25 moles of ethylene oxide.

Test N° 62

This test, illustrating the invention, uses a polymer neutralised 100% by ammonia, having a specific viscosity of 4.35 and made up, by percentage weight, of:

90% of acrylic acid

10% of tristyryl phenol methacrylate ethoxylated with 25 moles of ethylene oxide.

The results of all the tests are set out in tables 3.1 and 3.2 below.

TABLE 3.1

|  | Test | Brookfield viscosity in mPa · s | |
|---|---|---|---|
|  | No. | 10 r/min | 100 r/min |
| Prior art | 33 | Impossible | Impossible |
| Prior art | 34 | 700 | 270 |
| Invention | 35 | 2840 | 1290 |
| Invention | 36 | 800 | 950 |

TABLE 3.1-continued

|  | Test | Brookfield viscosity in mPa · s | |
|---|---|---|---|
|  | No. | 10 r/min | 100 r/min |
| Invention | 37 | 840 | 560 |
| Invention | 38 | 1160 | 800 |
| Invention | 39 | 540 | 730 |
| Invention | 40 | 440 | 515 |
| Invention | 41 | 1360 | 1000 |
| Invention | 42 | 280 | 260 |
| Invention | 43 | 200 | 185 |
| Invention | 44 | 320 | 290 |
| Invention | 45 | 880 | 510 |
| Invention | 46 | 1280 | 570 |
| Invention | 47 | 1050 | 550 |
| Invention | 48 | 1600 | 635 |
| Invention | 49 | 1480 | 640 |
| Invention | 50 | 400 | 260 |
| Invention | 51 | 1400 | 630 |

TABLE 3.2

|  | Test | Brookfield viscosity in mPa · s | |
|---|---|---|---|
|  | No. | 10 r/min | 100 r/min |
| Invention | 52 | 1360 | 1000 |
| Invention | 53 | 400 | 460 |
| Invention | 54 | 460 | 470 |
| Invention | 55 | 840 | 600 |
| Invention | 56 | 2160 | 830 |
| Invention | 57 | 350 | 170 |
| Invention | 58 | 680 | 390 |
| Invention | 59 | 480 | 350 |
| Invention | 60 | 720 | 380 |
| Invention | 61 | 1450 | 710 |
| Invention | 62 | 700 | 390 |

Tables 3.1 and 3.2 highlight the fact that aqueous suspensions of talc can be produced by the invention having low Brookfield viscosities at a high concentration of dry substance.

The tables also show that the use of a polyacrylate commonly used to place mineral substances with a hydrophilic substance in suspension will not allow talc suspensions of a low Brookfield viscosity to be produced.

EXAMPLE 5

As with the preceding example, this example relates to the preparation of aqueous suspensions of talc but containing a different quantity of copolymer.

To this end and using the same operating method and the same equipment as those used in the preceding example, the Finntalc C10 sold by Finnminerals is mixed with a quantity of water necessary to produce a suspension with a 65% concentration of dry substance and a quantity of copolymer to be tested corresponding to 1.0% by dry weight of dry acid copolymer relative to the total weight of dry substance present in the suspension.

Test N° 63

This test, illustrating the prior art, uses a sodium polyacrylate with a specific viscosity of 0.45. It could not be placed in suspension since the agitator became blocked due to too high a viscosity.

Test N° 64

This test, illustrating the invention, uses a polymer which, after 100% neutralisation by soda, is a polymer which has a specific viscosity of 24 and is made up, by percentage weight, of:

85% of acrylic acid

15% of tristyryl phenol methacrylate ethoxylated with 25 moles of ethylene oxide.

Test N° 65

This test, illustrating the invention, uses a polymer which, after 100% neutralisation by soda, is a polymer which has a specific viscosity of 19 and is made up, by percentage weight, of: 42

80% of acrylic acid

20% of tristyryl phenol methacrylate ethoxylated with 25 moles of ethylene oxide and oxypropylated with 13 moles of propylene oxide.

Test N° 66

This test, illustrating the invention, uses a polymer made up, by percentage weight, of:

70% of acrylic acid

30% of tristyryl phenol methacrylate ethoxylated with 25 moles of ethylene oxide.

Test N° 67

This test, illustrating the invention, uses a polymer made up, by percentage weight, of:

60% of acrylic acid

40% of tristyryl phenol methacrylate ethoxylated with 25 moles of ethylene oxide.

Test N° 68

This test, illustrating the invention, uses a polymer which, after 100% neutralisation by soda, is a polymer which has a specific viscosity of 4.47 and is made up, by percentage weight, of:

50% of acrylic acid

10% of tristyryl phenol methacrylate ethoxylated with 25 moles of ethylene oxide 40% of acrylamido-2-methyl-2-propane sulphonic acid.

Test N° 69

This test, illustrating the invention, uses a polymer which, after 100% neutralisation by soda, is a polymer which has a specific viscosity of 3.0 and is made up, by percentage weight, of:

50% of acrylic acid

10% of tristyryl phenol methacrylate ethoxylated with 25 moles of ethylene oxide 40% ethylene glycol methacrylate phosphate.

Test N° 70

This test, illustrating the invention, uses a polymer which, after 100% neutralisation by soda, is a polymer which has a specific viscosity of 3.67 and is made up, by percentage weight, of:

40% of acrylic acid

10% of tristyryl phenol methacrylate ethoxylated with 25 moles of ethylene oxide 50% of acrylamide.

The results of all the tests are set out in table 4 below:

TABLE 4

|  | Test No. | Brookfield viscosity in mPa · s | |
|---|---|---|---|
|  |  | 10 r/min | 100 r/min |
| Prior art | 63 | Impossible | Impossible |
| Invention | 64 | 1000 | 305 |
| Invention | 65 | 500 | 180 |
| Invention | 66 | 1080 | 280 |
| Invention | 67 | 780 | 220 |
| Invention | 68 | 280 | 200 |
| Invention | 69 | 200 | 160 |
| Invention | 70 | 165 | 175 |

Table 4 highlights the fact that the invention is capable of producing aqueous suspensions of talc with low Brookfield viscosities at a high concentration of dry substance.

It also demonstrates that using polyacrylate such as commonly used to place mineral substances with a hydrophilic surface in suspension will not produce talc suspensions with a low Brookfield viscosity.

EXAMPLE 6

This example relates to the preparation of aqueous suspensions of mica.

To this end, using the same operating method and the same equipment as those used in example 1, the mica, sold under the name of Ascoat 30 by Jungbunzlauer GmbH, is mixed with a quantity of water necessary to obtain a suspension with a 68% concentration of dry substance and a quantity of copolymer to be tested corresponding to 0.6% by dry weight of dry copolymer relative to the total weight of dry substance present in the suspension.

Test N° 71

This test, illustrating the prior art, uses a copolymer 100% neutralised by soda having a specific viscosity of 4.7 and made up, by percentage weight, of 90% acrylic acid and 10% methacrylate of lauric alcohol ethoxylated with 23 moles of ethylene oxide.

Test N° 72

This test, illustrating the prior art, uses a copolymer 100% neutralised by soda having a specific viscosity of 4.66 and made up, by percentage weight, of 90% acrylic acid and 10% nonyl phenol methacrylate ethoxylated with 30 moles of ethylene oxide.

Test N° 73

This test, illustrating the invention, uses a polymer neutralised 100% by soda, having a specific viscosity of 4.0 and made up, by percentage weight, of:

90% of acrylic acid

10% of tristyryl phenol methacrylate ethoxylated with 8 moles of ethylene oxide and oxypropylated with 13 moles of propylene oxide.

Test N° 74

This test, illustrating the invention, uses a polymer neutralised 100% by soda, having a specific viscosity of 4.35 and made up, by percentage weight, of:

90% of acrylic acid

10% of tristyryl phenol methacrylate ethoxylated with 25 moles of ethylene oxide.

Test N° 75

This test, illustrating the invention, uses a polymer neutralised 100% by soda, having a specific viscosity of 4.38 and made up, by percentage weight, of:

90% of acrylic acid

10% of tristyryl phenol methacrylate ethoxylated with 40 moles of ethylene oxide.

Test N° 76

This test, illustrating the invention, uses a polymer neutralised 100% by soda, having a specific viscosity of 4.43 and made up, by percentage weight., of:

90% of acrylic acid

10% of tristyryl phenol methacrylate ethoxylated with 60 moles of ethylene oxide.

Test N° 77

This test, illustrating the invention, uses a polymer neutralised 100% by soda, having a specific viscosity of 2.54 and made up, by percentage weight, of:

95% of acrylic acid

5% of methacrylurethane of general formula (I) in which the hydrophobic radical R' is a linear alkyl group with 22 carbon atoms, m and p are equal to 0, q=1 and n=25.

Test N° 78

This test, illustrating the invention, uses a polymer neutralised 100% by soda, having a specific viscosity of 1.52 and made up, by percentage weight, of:

95% of acrylic acid

5% of methacrylate of general formula (I) in which the hydrophobic radical R' is a —N—(R"R'") group where R" and R'" are linear alkyl chains with 12 carbon atoms, m and p are equal to 0, q=2 and n=25.

Test N° 79

This test, illustrating the invention, uses a polymer neutralised 100% by soda, having a specific viscosity of 2.47 and made up, by percentage weight, of:

95% of acrylic acid

5% of methacrylurethane of general formula (I) in which the hydrophobic radical R' is a branched alkyl group with 28 carbon atoms, m and p are equal to 0, q=1 and n=25.

Test N° 80

This test, illustrating the invention, uses a polymer neutralised 100% by soda, having a specific viscosity of 1.79 and made up, by percentage weight, of:

95% of acrylic acid

5% of methacrylurethane of general formula (I) in which the hydrophobic radical R' is a branched alkyl group with 30 carbon atoms, m and p are equal to 0, q=1 and n =25.

Test N° 81

This test, illustrating the invention, uses a polymer neutralised 100% by soda, having a specific viscosity of 2.59 and made up, by percentage weight, of:

90% of acrylic acid

10% of methacrylate of general formula (I) in which the hydrophobic radical R' is a branched alkyl group with 32 carbon atoms, m and p are equal to 0, q=1 and n=25.

Test N° 82

This test, illustrating the invention, uses a polymer neutralised 100% by soda, having a specific viscosity of 3.02 and made up, by percentage weight, of:

97% of acrylic acid

3% of tristyryl phenol methacrylate ethoxylated with 25 moles of ethylene oxide.

Test N° 83

This test, illustrating the invention, uses a polymer neutralised 100% by soda, having a specific viscosity of 3.94 and made up, by percentage weight, of:

93% of acrylic acid

7% of tristyryl phenol methacrylate ethoxylated with 25 moles of ethylene oxide.

Test N° 84

This test, illustrating the invention, uses a polymer neutralised 100% by soda, having a specific viscosity of 3.74 and made up, by percentage weight, of:

85% of acrylic acid

15% of tristyryl phenol methacrylate ethoxylated with 25 moles of ethylene oxide.

Test N° 85

This test, illustrating the invention, uses a polymer neutralised 100% by soda, having a specific viscosity of 4.38 and made up, by percentage weight, of:

85% of acrylic acid

5% of acrylamide

10% of tristyryl phenol methacrylate ethoxylated with 25 moles of ethylene oxide.

Test N° 86

This test, illustrating the invention, uses a polymer neutralised 100% by soda, having a specific viscosity of 0.67 and made up, by percentage weight, of:

95% of acrylic acid

5% of tristyryl phenol methacrylate ethoxylated with 25 moles of ethylene oxide.

Test N° 87

This test, illustrating the invention, uses a polymer neutralised 100% by soda, having a specific viscosity of 1.94 and made up, by percentage weight, of:

90% of acrylic acid

10% of tristyryl phenol methacrylate ethoxylated with 25 moles of ethylene oxide.

Test N° 88

This test, illustrating the invention, uses a polymer neutralised 100% by soda, having a specific viscosity of 2.66 and made up, by percentage weight, of:

90% of acrylic acid

10% of tristyryl phenol methacrylate ethoxylated with 25 moles of ethylene oxide.

All the test results are set out in table 5 below:

TABLE 5

| Test | Test No. | Brookfield viscosity in mPa · s | |
|---|---|---|---|
| | | 10 r/min | 100 r/min |
| Prior art | 71 | 5200 | 1800 |
| Prior art | 72 | 5200 | 1600 |
| Invention | 73 | 1500 | 560 |
| Invention | 74 | 2550 | 940 |
| Invention | 75 | 3400 | 1300 |
| Invention | 76 | 2500 | 440 |
| Invention | 77 | 1250 | 770 |
| Invention | 78 | 1400 | 500 |
| Invention | 79 | 1100 | 440 |
| Invention | 80 | 1000 | 400 |
| Invention | 81 | 800 | 420 |
| Invention | 82 | 2800 | 1000 |
| Invention | 83 | 2000 | 1300 |
| Invention | 84 | 1000 | 440 |
| Invention | 85 | 1700 | 720 |
| Invention | 86 | 1550 | 670 |
| Invention | 87 | 1400 | 740 |
| Invention | 88 | 2300 | 1030 |

Table 5 highlights the fact that the invention can be used to obtain aqueous suspensions of mica with low Brookfield viscosities at a high concentration of dry substance.

The table also shows that aqueous suspensions of mica with a low Brookfield viscosity can not be obtained using a copolymer of prior art.

EXAMPLE 7

This example relates to the preparation of aqueous suspensions of kaolin.

To this end, using the same operating method and the same equipment as those used in example 1, the kaolin, sold under the name of SPS by ECC, is mixed with a quantity of water necessary to obtain a suspension with a 66% concentration of dry substance and a quantity of copolymer to be tested corresponding to 0.52% by dry weight of dry acid copolymer relative to the total weight of dry substance present in the suspension.

Test N° 89

This test, illustrating the prior art, uses a sodium polyacrylate with a specific viscosity of 0.45.

Test N° 90

This test, illustrating the invention, uses a polymer neutralised 100% by soda, having a specific viscosity of 0.40 and made up, by percentage weight, of:

95% of acrylic acid

5% of tristyryl phenol methacrylate ethoxylated with 25 moles of ethylene oxide.

Test N° 91

This test, illustrating the invention, uses a polymer neutralised 100% by soda, having a specific viscosity of 0.42 and made up, by percentage weight, of:

95% of acrylic acid

5% of methacrylate of general formula (I) in which the hydrophobic radical R' is a branched alkyl group with 32 carbon atoms, m and p are equal to 0, q=1 and n=25.

The results of the tests are set out in table 6 below:

TABLE 6

| Test | Test No. | Brookfield viscosity in mPa · s | |
|---|---|---|---|
| | | 10 r/min | 100 r/min |
| Prior art | 89 | 4000 | 850 |
| Invention | 90 | 3720 | 840 |
| Invention | 91 | 3700 | 710 |

Table 6 highlights the fact that the invention can be used to produce aqueous suspensions of kaolin with low Brookfield viscosities at a high concentration of dry substance.

EXAMPLE 8

This example relates to the preparation of aqueous suspensions of mixtures of mineral substances regardless of whether they have a hydrophilic or hydrophobic surface.

Test N° 92

This test illustrates the invention and consists in preparing in parallel an aqueous suspension of calcium carbonate and an aqueous suspension of kaolin, then forming a mixture of equal weight of dry substance of the two aqueous suspensions produced.

To this end, using a marble from a Norwegian deposit in which the grain size is such that 60% of the particles are of a diameter of less than 2 micrometers, a calcium carbonate aqueous suspension is made up by introducing, by pouring and under agitation, a quantity of said marble needed to make up a suspension with a 70% concentration of dry substance, into a two-liter beaker containing water. This beaker also contains a quantity of copolymer to be tested corresponding to 0.5% by weight of dry copolymer relative to the total weight of dry substance present in the suspension.

The copolymer used in this test is a polymer which, after 100% neutralisation by soda, is a polymer with a specific viscosity of 4.35 and made up, by percentage weight, of:

90% acrylic acid

10% of tristyryl phenol methacrylate ethoxylated with 25 moles of ethylene oxide.

In the same manner and using the same equipment, an aqueous suspension of kaolin (sold under the name SPS by ECC) is prepared simultaneously, having a concentration of 63% dry substance and a content of copolymer to be tested of 0.5% by dry acid weight relative to the total weight of dry substance present in the suspension.

After agitating these two suspensions for 20 minutes, they are mixed by pouring them into a beaker, 714.3 grams of the one and 793.7 grams of the other, to produce an aqueous suspension which is 50% by dry weight of calcium carbonate and 50% by dry weight of kaolin.

After agitating the mixture for 10 minutes, the Brookfield viscosity (To) is measured, at ambient temperature, using a Brookfield viscometer of the DVII type at 100 r/min using the appropriate spindle. The measured Brookfield viscosity is 1900 mPa.s.

The aqueous suspension obtained in accordance with the invention is therefore a mixed suspension (50%/50% by dry weight) of calcium carbonate and kaolin which is easy to handle at a high concentration of dry substance (66.3%).

Test N° 93

This test illustrates the invention and consists in preparing in parallel an aqueous suspension of calcium carbonate and an aqueous suspension of kaolin, then forming a mixture to produce a suspension of 70% by dry weight of calcium carbonate and 30% by cry weight of kaolin.

To this end, using a marble from a Norwegian deposit in which the grain size is such that 60% of the particles are of a diameter of less than 2 micrometers, a calcium carbonate suspension is made up by introducing, by pouring and under agitation, a quantity of said marble needed to make up a suspension with a 70% concentration of dry substance, into a two-liter beaker containing water. This beaker also contains a quantity of copolymer to be tested corresponding to 0.5% by weight of dry acid copolymer relative to the total weight of dry substance present in the suspension.

The copolymer used in this test is a polymer which, after 100% neutralisation by soda, is a polymer with a specific viscosity of 4.35 and made up, by percentage weight, of:

90% acrylic acid

10% of tristyryl phenol methacrylate ethoxylated with 25 moles of ethylene oxide.

In the same manner and using the same material, an aqueous suspension of kaolin (sold under the name SPS by ECC) is prepared simultaneously, having a concentration of 63% dry substance and a content of copolymer to be tested of 0.5% by acid dry weight relative to the total weight of dry substance present in the suspension.

After agitating these two suspensions for 20 minutes, they are mixed by pouring them into a beaker, 1000 grams of the one and 476.2 grams of the other, to produce an aqueous suspension which is 70% by dry weight of calcium carbonate and 30% by dry weight of kaolin.

After agitating the mixture for 10 minutes, the Brookfield viscosity (To) is measured, at ambient temperature, using a Brookfield viscometer of the DVII type at 100 r/min using the appropriate spindle. The measured Brookfield viscosity is 1100 mPa.s.

The aqueous suspension obtained in accordance with the invention is therefore a mixed suspension (70%/30% by dry weight) of calcium carbonate and kaolin which is easy to handle at a high concentration of dry substance (67.7%).

Test N° 94

This test illustrates the invention and consists in preparing in parallel an aqueous suspension of kaolin and an aqueous suspension of mica, then forming a mixture to obtain a suspension of 50% by dry weight of kaolin and 50% by dry weight of mica.

To this end, an aqueous suspension of kaolin is prepared by introducing, by pouring and under agitation, a quantity of kaolin (marketed under the name of SPS by ECC) needed to make up a suspension with a 65.1% concentration of dry substance, into a two-liter beaker fitted with a Pendraulik agitator and containing water. This beaker also contains a quantity of copolymer to be tested corresponding to 1.0% by weight of dry acid copolymer relative to the total weight of dry substance present in the suspension.

The copolymer used in this test is a polymer which, after 100% neutralisation by soda, is a polymer with a specific viscosity of 2.54 and made up, by percentage weight, of:

95% acrylic acid

5% of methacrylurethane of the general formula (I) in which the hydrophobic radical R' is a linear alkyl group with 22 carbon atoms, m and p are equal to 0, q=1 and n=25.

In the same manner and using the same equipment, an aqueous suspension of mica (sold under the name Ascoat 30 by Jungbunzlauer GmbH) is prepared simultaneously, having a concentration of 67.4% dry substance and a content of copolymer to be tested of 0.6% by dry weight relative to the total weight of dry substance present in the suspension.

After agitating these two suspensions for 20 minutes, they are mixed by pouring them into a beaker, 760 grams of the one and 742 grams of the other, to produce an aqueous suspension which is 50% by dry weight of kaolin and 50% by dry weight of mica.

After agitating the mixture for 10 minutes, the Brookfield viscosity (To) is measured, at ambient temperature, using a Brookfield viscometer of the DVII type at 100 r/min using the appropriate spindle. The measured Brookfield viscosity is 732 mpa.s.

The aqueous suspension obtained in accordance with the invention is therefore a mixed suspension (50%/50% by dry weight) of kaolin and mica which is easy to handle at a high concentration of dry substance (66.2%).

Test N° 95

This test illustrates the invention and consists in preparing in parallel an aqueous suspension of kaolin and an aqueous suspension of mica, then forming a mixture to obtain a suspension of 75% by dry weight of kaolin and 25% by dry weight of mica.

To this end, an aqueous suspension of kaolin is prepared by introducing, by pouring and under agitation, a quantity of kaolin (marketed under the name of SPS by ECC) needed to make up a suspension with a 65.1% concentration of dry substance, into a two-liter beaker fitted with a Pendraulik agitator and containing water. This beaker also contains a quantity of copolymer to be tested corresponding to 1.0% by weight of dry acid copolymer relative to the total weight of dry substance present in the suspension.

The copolymer used in this test is a polymer which, after 100% neutralisation by soda, is a polymer with a specific viscosity of 2.54 and made up, by percentage weight, of:
  95% acrylic acid
  5% of methacrylurethane of the general formula (I) in which the hydrophobic radical R' is a linear alkyl group with 22 carbon atoms, m and p are equal to 0, q=1 and n=25.

In the same manner and using the same equipment, an aqueous suspension of mica (sold under the name Ascoat 30 by Jungbunzlauer GmbH) is prepared simultaneously, having a concentration of 67.4% dry substance and a content of copolymer to be tested of 0.6% by dry weight relative to the total weight of dry substance present in the suspension.

After agitating these two suspensions for 20 minutes, they are mixed by pouring them into a beaker, 1152 grams of the one and 371 grams of the other, to produce an aqueous suspension which is 75% by dry weight of kaolin and 25% by dry weight of mica.

After agitating the mixture for 10 minutes, the Brookfield viscosity (To) is measured, at ambient temperature, using a Brookfield viscometer of the DVII type at 100 r/min using the appropriate spindle. The measured Brookfield viscosity is 1380 mPa.s.

The aqueous suspension obtained in accordance with the invention is therefore a mixed suspension (75%/25% by dry weight) of kaolin and mica which is easy to handle at a high concentration of dry substance (65.6%).

Test N° 96

This test illustrates the invention and consists in preparing in parallel an aqueous suspension of talc and an aqueous suspension of kaolin, then forming a mixture to obtain a suspension of 75% by dry weight of talc and 25% by dry weight of kaolin.

To this end, an aqueous suspension of talc is prepared by introducing, by pouring and under agitation, a quantity of talc (marketed under the name of Finntalc C10 by Finnminerals) needed to make up a suspension with a 64.9% concentration of dry substance, into a two-liter beaker fitted with a Pendraulik agitator and containing water. This beaker also contains a quantity of copolymer to be tested corresponding to 1.0% by weight of dry acid copolymer relative to the total weight of dry substance present in the suspension.

The copolymer used in this test is a polymer which, after 100% neutralisation by soda, is a polymer with a specific viscosity of 4.38 and made up, by percentage weight, of:
  85% acrylic acid
  5% of acrylamide
  10% of tristyryl phenol methacrylate ethoxylated with 25 moles of ethylene oxide.

In the same manner and using the same equipment, an aqueous suspension of kaolin (sold under the name of SPESWHITE by ECC) is prepared simultaneously, having a concentration of 65.1% dry substance and a content of copolymer to be tested of 1.0% by dry acid weight relative to the total weight of dry substance present in the suspension.

After agitating these two suspensions for 20 minutes, they are mixed by pouring them into a beaker, 1155.6 grams of the one and 384 grams of the other, to produce an aqueous suspension which is 75% by dry weight of talc and 25% by dry weight of kaolin.

After agitating the mixture for 10 minutes, the Brookfield viscosity (To) is measured, at ambient temperature, using a Brookfield viscometer of the DVII type at 100 r/min using the appropriate spindle. The measured Brookfield viscosity is 1230 mPa.s.

The aqueous suspension obtained in accordance with the invention is therefore a mixed suspension (75%/25% by dry weight) of talc and kaolin which is easy to handle at a high concentration of dry substance (65.0%).

Test N° 97

This test illustrates the invention and consists in preparing in parallel an aqueous suspension of talc and an aqueous suspension of kaolin, then forming a mixture to obtain a suspension of 50% by dry weight of talc and 50% by dry weight of kaolin.

To this end, an aqueous suspension of talc is prepared by introducing, by pouring and under agitation, a quantity of talc (marketed under the name of Finntalc C10 by Finnminerals) needed to make up a suspension with a 64.9% concentration of dry substance, into a two-liter beaker fitted with a Pendraulik agitator and containing water. This beaker also contains a quantity of copolymer to be tested corresponding to 1.0% by weight of dry acid copolymer relative to the total weight of dry substance present in the suspension.

The copolymer used in this test is a polymer which, after 100% neutralisation by soda, is a polymer with a specific viscosity of 4.38 and made up, by percentage weight, of:
  85% acrylic acid
  5% of acrylamide
  10% of tristyryl phenol methacrylate ethoxylated with 25 moles of ethylene oxide.

In the same manner and using the same equipment, an aqueous suspension of kaolin (sold under the name of SPESWHITE by ECC) is prepared simultaneously, having a concentration of 65.1% dry substance and a content of copolymer to be tested of 1.0% by dry acid weight relative to the total weight of dry substance present in the suspension.

After agitating these two suspensions for 20 minutes, they are mixed by pouring them into a beaker, 770.5 grams of the one and 768 grams of the other, to produce an aqueous suspension which is 50% by dry weight of talc and 50% by dry weight of kaolin.

After agitating the mixture for 10 minutes, the Brookfield viscosity (To) is measured, at ambient temperature, using a Brookfield viscometer of the DVII type at 100 r/min using the appropriate spindle. The measured Brookfield viscosity is 2380 mpa.s.

The aqueous suspension obtained in accordance with the invention is therefore a mixed suspension (50%/50% by dry weight) of talc and kaolin which is easy to handle at a high concentration of dry substance (65.0%).

Test N° 98

This test illustrates the invention and consists in preparing in parallel an aqueous suspension of talc and an aqueous suspension of kaolin, then forming a mixture to obtain a suspension of 25% by dry weight of talc and 75% by dry weight of kaolin.

To this end, an aqueous suspension of talc is prepared by introducing, by pouring and under agitation, a quantity of talc (marketed under the name of Finntalc C10 by Finnminerals) needed to make up a suspension with a 64.9% concentration of dry substance, into a two-liter beaker fitted with a Pendraulik agitator and containing water. This beaker also contains a quantity of copolymer to be tested corresponding to 1.0% by weight of dry acid copolymer relative to the total weight of dry substance present in the suspension.

The copolymer used in this test is a polymer which, after 100% neutralisation by soda, is a polymer with a specific viscosity of 4.38 and made up, by percentage weight, of:

85% acrylic acid
5% of acrylamide
10% of tristyryl phenol methacrylate ethoxylated with 25 moles of ethylene oxide.

In the same manner and using the same equipment, an aqueous suspension of kaolin (sold under the name of SPESWHITE by ECC) is prepared simultaneously, having a concentration of 65. 1% dry substance and a content of copolymer to be tested of 1% by dry weight relative to the total weight of dry substance present in the suspension.

After agitating these two suspensions for 20 minutes, they are mixed by pouring them into a beaker, 385.2 grams of the one and 1152 grams of the other, to produce an aqueous suspension which is 25% by dry weight of talc and 75% by dry weight of kaolin.

After agitating the mixture for 10 minutes, the Brookfield viscosity (To) is measured, at ambient temperature, using a Brookfield viscometer of the DVII type at 100 r/min using the appropriate spindle. The measured Brookfield viscosity is 1860 mPa.s.

The aqueous suspension obtained in accordance with the invention is therefore a mixed suspension (25%/75% by dry weight) of talc and kaolin which is easy to handle at a high concentration of dry substance (65.0%).

Test N° 99

This test illustrates the prior art and consists in preparing in parallel an aqueous suspension of talc and an aqueous suspension of calcium carbonate, then forming a mixture to obtain a suspension of 75% by dry weight of talc and 25% by dry weight of calcium carbonate.

To this end, an aqueous suspension of talc is prepared by introducing, by pouring and under agitation, a quantity of talc (marketed under the name of Finntalc C10 by Finnminerals) needed to make up a suspension with a 64.9% concentration of dry substance, into a two-liter beaker fitted with a Pendraulik agitator and containing water. This beaker also contains a quantity of sodium polyacrylate to be tested, having a specific viscosity of 0.48, corresponding to 0.15% by weight of dry copolymer relative to the total weight of dry substance present in the suspension and a quantity of an alkylene polyoxide (sold by BASF under the name of Pluronic PE 4300) corresponding to 1.4% by dry weight relative to the total weight of dry substance present in the suspension as well as a quantity of soda corresponding to 0.08% by weight relative to the dry weight of dry substance in the suspension.

In the same manner and using the same equipment, an aqueous suspension of calcium carbonate is prepared simultaneously, using a marble from a Norwegian deposit with a grain size such that 75% of the particles are of a diameter of less than 1 micrometer, having a concentration of 65% dry substance and a content of sodium polyacrylate equal to 0.5% by dry weight relative to the total weight of dry substance present in the suspension.

After agitating these two suspensions for 20 minutes, they are mixed by pouring them into a beaker, 1155.5 grams of the one and 384.6 grams of the other, to produce an aqueous suspension which is 75% by dry weight of talc and 25% by dry weight of calcium carbonate.

After agitating the mixture for 10 minutes, the Brookfield viscosity (To) is measured, at ambient temperature, using a Brookfield viscometer of the DVII type at 100 r/min using the appropriate spindle. The measured Brookfield viscosity is 150 mPa.s.

The aqueous suspension obtained in accordance with the invention is therefore a mixed suspension (75%/25% by dry weight) of talc and calcium carbonate -which is easy to handle at a high concentration of dry substance (65.0%) but requires the use of two different dispersing formulae, one for the hydrophilic mineral filler, the other for the hydrophobic mineral filler.

Test N° 100

This test illustrates the invention and consists in preparing in parallel an aqueous suspension of talc and an aqueous suspension of calcium carbonate, then forming a mixture to obtain a suspension of 75% by dry weight of talc and 25% by dry weight of calcium carbonate.

To this end, an aqueous suspension of talc is prepared by introducing, by pouring and under agitation, a quantity of talc (marketed under the name of Finntalc C10 by Finnminerals) needed to make up a suspension with a 64.9% concentration of dry substance, into a two-liter beaker fitted with a Pendraulik agitator and containing water. This beaker also contains a quantity of copolymer to be tested corresponding to 1.0% by weight of dry acid copolymer relative to the total weight of dry substance present in the suspension.

The copolymer used in this test is a polymer which, after 100% neutralisation by soda, is a polymer with a specific viscosity of 4.38 and made up, by percentage weight, of:

85% acrylic acid
5% of acrylamide
10% of tristyryl phenol methacrylate ethoxylated with 25 moles of ethylene oxide.

In the same manner and using the same equipment, an aqueous suspension of calcium carbonate is prepared simultaneously, using a marble from a Norwegian deposit with a grain size such that 75% of the particles are of a diameter of less than 1 micrometer, having a concentration of 65% dry substance and a content of copolymer to be tested of 1.0% by dry weight relative to the total weight of dry substance present in the suspension.

After agitating these two suspensions for 20 minutes, they are mixed by pouring them into a beaker, 1155.5 grams of the one and 384.6 grams of the other, to produce an aqueous suspension which is 75% by dry weight of talc and 25% by dry weight of calcium carbonate.

After agitating the mixture for 10 minutes, the Brookfield viscosity (To) is measured, at ambient temperature, using a Brookfield viscometer of the DVII type at 100 r/min using the appropriate spindle. The measured Brookfield viscosity is 150 mpa.s.

The aqueous suspension obtained in accordance with the invention is therefore a mixed suspension (75%/25% by dry weight) of talc and calcium carbonate which is easy to handle at a high concentration of dry substance (65.0%), and is so using a single dispersant.

Test N° 101

This test illustrates the prior art and consists in preparing directly an aqueous suspension of talc and an aqueous suspension of calcium carbonate, then forming a mixture to obtain a suspension of 50% by dry weight of talc and 50% by dry weight of calcium carbonate.

To this end, an aqueous suspension of talc is prepared by introducing, by pouring and under agitation, a quantity of talc (marketed under the name of Finntalc C10 by Finnminerals) needed to make up a suspension with a 64.9% concentration of dry substance, into a two-liter beaker fitted with a Pendraulik agitator and containing water. This beaker also contains a quantity of sodium polyacrylate to be tested having a specific viscosity of 0.48 and corresponding to 0.15% by weight of dry copolymer relative to the total weight of dry substance present in the suspension and a quantity of an alkylene polyoxide (sold by BASF under the name of Pluronic PE 4300) corresponding to 1.4% by dry weight relative to the total weight of dry substance present in the suspension as well as a quantity of soda corresponding to 0.08% by weight relative to the dry weight of dry substance present in the suspension.

In the same manner and using the same equipment, an aqueous suspension of calcium carbonate is prepared simultaneously, using a marble from a Norwegian deposit with a grain size such that 75% of the particles are of a diameter of less than 1 micrometer, having a concentration of 65% dry substance and a content of copolymer to be tested of 0.5% by dry weight relative to the total weight of dry substance present in the suspension.

After agitating these two suspensions for 20 minutes, they are mixed by pouring them into a beaker, 770.4 grams of the one and 769.2 grams of the other, to produce an aqueous suspension which is 50% by dry weight of talc and 50% by dry weight of calcium carbonate.

After agitating the mixture for 10 minutes, the Brookfield viscosity (To) is measured, at ambient temperature, using a Brookfield viscometer of the DVII type at 100 r/min using the appropriate spindle. The measured Brookfield viscosity is 350 mpa.s for a concentration of dry substance of 65.0%.

It should be pointed out that the test required the use of two different dispersing formulae, one for the hydrophilic mineral filler and the other for the hydrophobic mineral filler.

Test N° 102

This test illustrates the invention and consists in preparing in parallel an aqueous suspension of talc and an aqueous suspension of calcium carbonate, then forming a mixture to obtain a suspension of 50% by dry weight of talc and 50% by dry weight of calcium carbonate.

To this end, an aqueous suspension of talc is prepared by introducing, by pouring and under agitation, into a two-liter beaker fitted with a Pendraulik agitator and containing water, a quantity of talc (sold by Finnminerals under the name of Finntalc $C_{10}$) necessary to obtain a suspension with a 64.9% concentration of dry substance. This beaker also contains a quantity of copolymer to be tested and corresponding to 1.0% by weight of dry acid copolymer relative to the total weight of dry substance present in the suspension.

The copolymer used in this test is a polymer which, after 100% neutralisation by soda, is a polymer with a specific viscosity of 4.38 and made up, by percentage weight, of:
85% acrylic acid
5% of acrylamide
10% of tristyryl phenol methacrylate ethoxylated with 25 moles of ethylene oxide.

In the same manner and using the same equipment, starting with a marble from a Norwegian deposit in which the grain size is such that 75% of the particles are of a diameter less than 1 micrometer, an aqueous suspension of calcium carbonate is prepared having a concentration of dry substance of 65% and a content of copolymer to be tested of 1% by weight dry acid relative to the total weight of dry substance present in the suspension.

After agitating these two suspensions for 20 minutes, they are mixed by pouring them into a beaker, 770.4 grams of the one and 769.2 grams of the other in order to produce an aqueous suspension of 50% by dry weight of talc and 50% by dry weight of calcium carbonate.

After agitating the mixture for 10 minutes, the Brookfield viscosity (To) is measured, at ambient temperature, using a Brookfield viscometer of the DVII type at 100 r/min using the appropriate spindle. The measured Brookfield viscosity is 350 mpa.s.

The aqueous suspension obtained in accordance with the invention is therefore a mixed suspension (50%/50% by dry weight) of talc and calcium carbonate which is easy to handle at a high concentration of dry substance (65%), and is so using a single dispersant.

Test N° 103

This test, illustrating the prior art, consists in preparing in parallel an aqueous suspension of talc and an aqueous suspension of calcium carbonate, then forming a mixture to obtain a suspension which is 25% by dry weight of talc and 75% by dry weight of calcium carbonate.

To this end, an aqueous suspension of talc is prepared by introducing, by pouring and under agitation, into a two-liter beaker fitted with a Pendraulik agitator and containing water, a quantity of talc (sold by Finnminerals under the name of Finntalc $C_{10}$) necessary to obtain a suspension with a 64.9% concentration of dry substance. This beaker also contains a quantity of sodium polyacrylate to be tested having a specific viscosity of 0.48 and corresponding to 0.15% by weight of dry copolymer relative to the total weight of dry substance present in the suspension and a quantity of an alkylene polyoxide (sold by BASF under the name of Pluronic PE 4300) corresponding to 1.4% by dry weight relative to the total weight of dry substance present in the suspension as well as a quantity of soda corresponding to 0.08% by dry weight of dry substance present in the suspension.

In the same manner and using the sane equipment, starting with a marble from a Norwegian deposit in which the grain size is such that 75% of the particles are of a diameter less than 1 micrometer, an aqueous suspension of calcium carbonate is prepared having a concentration of dry substance of 65% and a content of copolymer to be tested of 0.5% by dry weight relative to the total weight of dry substance present in the suspension.

After agitating these two suspensions for 20 minutes, they are mixed by pouring them into a beaker, 385.2 grams of the one and 1153.8 grams of the other in order to produce an aqueous suspension of 25% by dry weight of talc and 75% by dry weight of calcium carbonate.

After agitating the mixture for 10 minutes, the Brookfield viscosity (To) is measured, at ambient temperature, using a Brookfield viscometer of the DVII type at 100 r/min using the appropriate spindle. The measured Brookfield viscosity is 465 mpa.s. for a concentration of dry substance of 65.0%.

It should be pointed out that this test required the use of two dispersing formulae, one for the hydrophilic mineral filler and the other for the hydrophobic mineral filler.

Test N° 104

This test, illustrating the invention, consists in preparing in parallel an aqueous suspension of talc and an aqueous suspension of calcium carbonate, then forming a mixture to obtain a suspension which is 25% by dry weight of talc and 75% by dry weight of calcium carbonate.

To this end, an aqueous suspension of talc is prepared by introducing, by pouring and under agitation, into a two-liter beaker fitted with a Pendraulik agitator and containing water, a quantity of talc (sold by Finnminerals under the name of Finntalc $C_{10}$) necessary to obtain a suspension with a 64.9% concentration of dry substance and a quantity of copolymer to be tested corresponding to 1.0% by weight of dry acid copolymer relative to the total weight of dry substance present in the suspension.

The copolymer used in this test is a polymer which, after 100% neutralisation by soda, is a polymer with a specific viscosity of 4.38, made up, by percentage weight, of:
  85% of acrylic acid
  5% of acrylamide
  10% of tristyrylphenol methacrylate ethoxylated with 25 moles of ethylene oxide.

In the same manner and using the same equipment, starting with a marble from a Norwegian deposit in which the grain size is such that 75% of the particles are of a diameter less than 1 micrometer, an aqueous suspension of calcium carbonate is prepared having a concentration of dry substance of 65% and a content of copolymer to be tested of 1% by dry acid weight relative to the total weight of dry substance present in the suspension.

After agitating these two suspensions for 20 minutes, they are mixed by pouring them into a beaker, 385.2 grams of the one and 1153.8 grams of the other in order to produce an aqueous suspension of 25% by dry weight of talc and 75% by dry weight of calcium carbonate.

After agitating the mixture for 10 minutes, the Brookfield viscosity (To) is measured, at ambient temperature, using a Brookfield viscometer of the DVII type at 100 r/min using the appropriate spindle. The measured Brookfield viscosity is 220 mPa.s.

The aqueous suspension obtained in accordance with the invention is therefore a mixed suspension (25%/75% by dry weight) of talc and calcium carbonate which is easy to handle at a high concentration of dry substance (65.0%) and is so with the aid of a single dispersant.

Test N° 105

This test, illustrating the invention, consists in preparing directly a mixed aqueous suspension of 50% by dry weight of calcium carbonate and 50% by dry weight of talc.

To this end, starting with a marble from a Norwegian deposit with a grain size such that 60% of the particles are of a diameter of less than 2 micrometers and using talc (sold by Finnminerals under the name Finntalc $C_{10}$, a mixed aqueous suspension of calcium carbonate and talc is prepared by adding, by pouring and under agitation, to a two-liter beaker containing water a same quantity of said marble and said talc necessary to produce a suspension of a 65% concentration of dry substance. this beaker also contains a quantity of copolymer to be tested corresponding to 2.0% by weight of dry acid copolymer relative to the total weight of dry substance present in the suspension.

The copolymer used in this test is a polymer which, after 100% neutralisation by soda, is a polymer with a specific viscosity of 4.35, made up, by percentage weight, of: 90% of acrylic acid 5% of acrylamide 10% of tristyryl phenol methacrylate ethoxylated with 25 moles of ethylene oxide.

After agitating the mixture for 20 minutes, the Brookfield viscosity (To) is measured, at ambient temperature, using a Brookfield viscometer of the DVII type at 100 r/min using the appropriate spindle. The measured Brookfield viscosity is 350 mPa.s The aqueous suspension obtained in accordance with the invention is therefore a mixed suspension (50%/50% by dry weight) of calcium carbonate and talc which is easy to handle with a high concentration of dry substance (65.0).

EXAMPLE 9

This example relates to the preparation of a coarse calcium carbonate suspension which is subjected to a crushing process in order to refine it to a micro-particulate suspension. To this end, a suspension of coarse calcium carbonate was prepared from a natural calcium carbonate marketed under the name of BL 200 by OMYA S.A., using the various crushing agents to be tested:

Test N° 106

This test, illustrating the invention, uses a polymer neutralised 100% by soda, having a specific viscosity of 0.67 and made up, by percentage weight, of:
  95% of acrylic acid
  5% of methacrylate of general formula (I) in which the hydrophobic radical R' is a branched alkyl group with 32 carbon atoms, m and p are equal to 0, q=1 and n=25.

Test N° 107

This test, illustrating the invention, uses a polymer neutralised 100% by soda, having a specific viscosity of 4.6 and made up, by percentage weight, of:
  90% of acrylic acid
  10% of tristyrylphenol methacrylate ethoxylated with 25 moles of ethylene oxide.

For each test, an aqueous suspension of calcium carbonate from the Orgon deposit (France) is prepared, having a grain size such that 19% of the particles are of a diameter of less than 2 micrometers.

The aqueous suspension has a concentration of dry substance of 76% by weight relative to the total weight.

The crushing agent is introduced into this suspension in the quantities indicated in the table below, expressed as a percentage by dry weight relative to the weight of dry calcium carbonate to be crushed.

The suspension circulates in a crusher of the Dyno-Mill type with a fixed cylinder and rotating impeller, the crushing medium of which is corundum balls of a diameter ranging between 0.6 millimeter and 1.0 millimeter.

The total volume occupied by the crushing medium is 1 150 cubic centimeters whilst its weight is 2 900 g. The volume of the crushing chamber is 1 400 cubic centimeters.

The circumferential speed of the crusher is 10 meters per second.

The calcium carbonate suspension is recycled at a rate of 18 liters per hour.

The output of the Dyno-Mill crusher is fitted with a separator with a mesh size of 200 micrometers so that the suspension resulting from crushing and the crushing medium can be separated.

The temperature during each crushing test is maintained at approximately 60° C.

At the end of crushing (T0), a sample of the refined pigment suspension is drawn off into a flask and the viscosity is measured by means of a Brookfield viscometer of the RVT type at a temperature of 20° C. and rotation speeds of 10 revolutions per minute and 100 revolutions per minute using the appropriate spindle.

The grain size is determined by measurement using a Sedigraph 5100 produced by Micromeritics.

The results of all the experiments are set out in table 7 below.

TABLE 7

| | | Crushing agent used | | | Brookfield viscosity | |
|---|---|---|---|---|---|---|
| | | Specific | Consumption | Grain size | in mPa · s | |
| | Test No. | viscosity | % dry/dry | % <1 μm | 10 r/min | 100 r/min |
| Invention | 106 | 0.67 | 1.27 | 31 | 8100 | 1250 |
| Invention | 107 | 4.6 | 1.1 | 45 | 8500 | 2040 |

Table 7 demonstrates that aqueous suspensions of refined calcium carbonate can be obtained with a high concentration of dry substance.

EXAMPLE 10

This example relates to the preparation of an aqueous suspension of coarse mica (sold under the name of ASCOAT 30 by Jungbunzlauer GmbH, with a grain size such that 18% of the particles are of a diameter of less than one micrometer) which is subjected to crushing in order to fine it down to a micro-particulate suspension.
Test N° 108

This test, illustrating the invention, uses, along with the same equipment and the same operating method as those of example 9 with the exception of the dry substance of the suspension, which is equal to 65%, a polymer 100% neutralised by soda having a specific viscosity of 1.85 and made up, by percentage weight, of:

95% acrylic acid

5% of methacrylate of general formula (I) in which the hydrophobic radical R' is a branched alkyl group with 32 carbon atoms, m and p are equal to 0, q=1 and n=25.

The results obtained are set out in table 8 below:

Table 8 demonstrates that refined aqueous suspensions of mica with a high concentration of dry substance can be obtained, which is not possible using an agent of the prior art.

EXAMPLE 11

In this example, the rheological behaviour of aqueous suspensions of calcium carbonate, prepared in accordance with the operating method outlined in example 1, is measured.

After agitating for 20 minutes, the rheological behaviour of the suspension prepared in this manner is measured, at ambient temperature, using a Stress Tech® visco-elasticity meter made by Rheological Instruments AB (Sweden) fitted with CC25 coaxial cylinders.

The method used to measure the rheological behaviour of the suspension is identical in each of the tests, namely, for each test, a sample of the suspension prepared using the polymer to be tested is injected into the cylinder of the visco-elasticity meter and it is subjected to pre-shearing at 10 Pa for 12 seconds and, after a waiting time of 180 seconds which corresponds to the equilibrium time, it is subjected to shearing progressing on a linear basis from 0.025 Pa to 2.5 Pa in 100 seconds and 40 intervals.

The yield stress, corresponding to the shear to be applied to the suspension to break the internal bonds and obtain a suspension of reduced viscosity, is determined by the maximum value of the viscosity curve in Pa.s as a function of the shear in Pa.
Test N° 109

This test, illustrating the prior art, uses an aqueous suspension as prepared for test N° 1.
Test N° 110

This test, illustrating the invention, uses the aqueous suspension of test N° 8.
Test N° 111

This test, illustrating the invention, uses the aqueous suspension of test N° 9.
Test N° 112

This test, illustrating the invention, uses an aqueous suspension containing a polymer neutralised 100% by soda, having a specific viscosity of 1.83 and made up of:

TABLE 8

| | | Crushing agent used | | | Brookfield viscosity | |
|---|---|---|---|---|---|---|
| | | Specific | Consumption | Grain size | in mPa · s | |
| | Test No. | viscosity | % dry/dry | % <1 μm | 10 r/min | 100 r/min |
| Invention | 108 | 1.85 | 0.70 | 36.1 | 25000 | 4100 |

90% of acrylic acid

10% of methacrylate of general formula (I) in which the hydrophobic radical R' is a branched alkyl group with 32 carbon atoms, m and p are equal to zero, q=1 and n=25.

Test N° 113

This test, illustrating the invention, uses an aqueous suspension containing a polymer neutralised 100% by soda, having a specific viscosity of 1.80 and made up of:

90% of acrylic acid

10% of methacrylate of general formula (I) in which the hydrophobic radical R' is a branched alkyl group with 32 carbon atoms, m and p are equal to zero, q=2 and n=25.

Test N° 114

This test, illustrating the invention, uses the aqueous suspension of test N° 6.

The results of all the experiments are set out in table 9 below.

TABLE 9

| Test N° | | Viscosity in Pa · s | Yield stress in Pa |
|---|---|---|---|
| Prior art | 109 | 362.8 | 0.4603 |
| Invention | 110 | 40.9 | 0.8459 |
| Invention | 111 | 94.6 | 1.1450 |
| Invention | 112 | 118.5 | 0.7363 |
| Invention | 113 | 124.8 | 0.6744 |
| Invention | 114 | 129 | 0.8600 |

Table 9 shows that the aqueous suspensions of calcium carbonate of the invention have a higher yield stress than that of the prior art, characteristic of suspensions exhibiting a good degree of stability.

EXAMPLE 12

In this example, the rheological behaviour of aqueous suspensions of talc prepared in accordance with the operating method of example 4, is measured.

For all the following tests, the operating method and the equipment used for this measurement are identical to those used in example 11.

Test N° 115

This test, illustrating the prior art, uses the aqueous suspension of test N° 34.

Test N° 116

This test, illustrating the invention, uses the aqueous suspension of test N° 37.

The results of all the experiments are set out in table 10 below.

TABLE 10

| Test N° | | Viscosity in Pa · s | Yield stress in Pa |
|---|---|---|---|
| Prior art | 115 | 22.9 | 0.1180 |
| Invention | 116 | 14.7 | 0.3035 |

Table 10 shows that the aqueous suspensions of talc proposed by the invention have a higher yield stress than that of the prior art, characteristic of suspensions exhibiting a high stability.

EXAMPLE 13

In this example, a measurement is taken of the rheological behaviour of aqueous suspensions of talc prepared by the operating method of example 5.

After 45 minutes of agitation, the rheological behaviour of the suspensions prepared in this manner is measured, at 25° C., using a Stress Tech® visco-elasticity meter made by Rheological Instruments AB (Sweden), fitted with CC25 coaxial cylinders.

The operating method used to measure the rheological behaviour of the suspensions is identical for each of the tests, namely, for each test, a sample of the suspension prepared using the polymer to be tested is injected into the cylinder of the visco-elasticity meter and is subjected to pre-shearing at 15 Pa for 12 seconds and, after a waiting time of 600 seconds which corresponds to the equilibrium time, it is subjected to shearing progressing on a linear basis from 0.1 Pa to 2.5 Pa in 100 seconds and 60 intervals.

The yield stress, corresponding to the shear to be applied to the suspension to break the internal bonds and obtain a suspension of reduced viscosity, is determined by the maximum value of the viscosity curve in Pa.s as a function of the shear in Pa.

Test N° 117

This test, illustrating the prior art, uses an aqueous suspension of talc obtained using 1.0% by dry weight of a mixture made up of 25 parts by weight of a sodium polyacrylate with a specific viscosity of 0.45 and 75 parts by weight of an alkylene polyoxide sold by BASF under the name of Pluronic PE 4300.

Test N° 118

This test, illustrating the invention, uses the aqueous suspension of test N° 66.

Test N° 119

This test, illustrating the invention, uses the aqueous suspension of test N° 67.

Test N° 120

This test, illustrating the invention, uses the aqueous suspension of test N° 68.

Test N° 121

This test, illustrating the invention, uses the aqueous suspension of test N° 69.

Test N° 122

This test, illustrating the invention, uses the aqueous suspension of test N° 70.

The results of all the experiments are set out in table 11 below.

TABLE 11

| Test N° | | Viscosity in Pa · s | Yield stress in Pa |
|---|---|---|---|
| Prior art | 117 | 2.0 | <0.1600 |
| Invention | 118 | 17.3 | 0.4001 |
| Invention | 119 | 10.6 | 0.2403 |
| Invention | 120 | 9.58 | 0.1603 |
| Invention | 121 | 3.68 | 0.1603 |
| Invention | 122 | 2.44 | 0.2002 |

Table 11 shows that the aqueous suspensions of talc of the invention have a higher yield stress than that of the prior art, characteristic of suspensions exhibiting a good degree of stability.

EXAMPLE 14

In this example, the Theological behaviour of aqueous suspensions of mica prepared in accordance with the operating method of example 6, is measured.

For all the following tests, the operating method and the equipment used for this measurement are identical to those used in example 11.

Test N° 123

This test, illustrating the prior art, uses an aqueous suspension containing a sodium polyacrylate with a specific viscosity of 0.45.

Test N° 124

This test, illustrating the invention, uses an aqueous suspension containing a polymer neutralised 100% by soda, having a specific viscosity of 1.83 and made up of:

90% of acrylic acid

10% of methacrylate of general formula (I) in which the hydrophobic radical R' is a branched alkyl group with 32 carbon atoms, m and p are equal to zero, q=1 and n=50.

Test N° 125

This test, illustrating the invention, uses an aqueous suspension of test N° 82.

Test N° 126

This test, illustrating the invention, uses an aqueous suspension containing a polymer neutralised 100% by soda, having a specific viscosity of 5.49 and made up of:

80% of acrylic acid

2% of ethyl acrylate

10% of methacrylic acid

10% of methacrylurethane of general formula (I) in which the hydrophobic radical R' is a tristyrylphenyl radical, m and p are equal to zero, q=1 and n=25.

The results of all the experiments are set out in table 12 below.

TABLE 12

| Test N° | Viscosity in Pa · s | Yield stress in Pa |
|---|---|---|---|
| Prior art | 123 | 15.5 | 0.1368 |
| Invention | 124 | 50.5 | 0.4758 |
| Invention | 125 | 28.4 | 0.6913 |
| Invention | 126 | 43.6 | 1.046 |

Table 12 shows that the aqueous suspensions of mica proposed by the invention have a higher yield stress than that of the prior art, characteristic of suspensions exhibiting a high stability.

EXAMPLE 15

In this example, a measurement is taken of the Theological behaviour of aqueous suspensions of talc and calcium carbonate prepared by the operating method of example 8.

For all the tests below, the operating method and the equipment used for this measurement are identical to those used in example 11.

Test N° 127

This test, illustrating the prior art, uses an aqueous suspension of test N° 99.

Test N° 128

This test, illustrating the invention, uses an aqueous suspension of test N° 100.

Test N° 129

This test, illustrating the prior art, uses an aqueous suspension of test N° 101.

Test N° 130

This test, illustrating the invention, uses an aqueous suspension of test N° 102.

Test N° 131

This test, illustrating the prior art, uses an aqueous suspension of test N° 103.

Test N° 132

This test, illustrating the invention, uses an aqueous suspension of test N° 104.

The results of all the experiments are set out in table 13 below.

TABLE 13

| | Test N° | Viscosity in Pa · s | Yield stress in Pa |
|---|---|---|---|
| Prior art | 127 | 68.7 | 0.304 |
| Invention | 128 | 139 | 1.083 |
| Prior art | 129 | 736 | 0.948 |
| Invention | 130 | 14200 | 3.994 |
| Prior art | 131 | 5790 | 1.912 |
| Invention | 132 | 5190 | 2.9480 |

Table 13 shows that the aqueous suspensions of talc of and calcium carbonate of the invention have a higher yield stress than that of the prior art, characteristic of suspensions exhibiting a good degree of stability.

EXAMPLE 16

This example relates to the use of aqueous suspensions of mineral fillers as proposed by the invention in the manufacture of coating colour for paper.

To this end, the coating colours are prepared by mixing the aqueous suspensions of mineral fillers to be tested in water with the other constituents of the coating colour, the composition by weight of which is as follows:

100 parts of aqueous suspensions to be tested with a content of 65% in dry substance 12 parts of a carboxylated styrene-butadiene latex marketed by Dow Chemical under the name of DL 905

0.5part of carboxymethyl cellulose sold by Metsa Serla under the name of Finnfix 5, the content of dry substance being in the order of 64.5% and the pH being equal to 8.4.

Brookfield viscosity measurements are then taken on the coating colours prepared in this manner, at ambient temperature and at 20 revolutions per minute, 50 revolutions per minute and 100 revolutions per minute using a Brookfield viscometer of the DVII type fitted with the appropriate spindle.

Test N° 133

This test, illustrating the prior art, uses an aqueous suspension of talc as prepared for test N° 34.

Test N° 134

This test, illustrating the invention, uses an aqueous suspension of talc as prepared for test N° 37.

The results of all the experiments are set out in table 14 below.

TABLE 14

| | | Brookfield viscosity in mPa · s | | |
|---|---|---|---|---|
| | Test N° | 20 r/min | 50 r/min | 100 r/min |
| Prior art | 133 | 4860 | 2892 | 2160 |
| Invention | 134 | 1420 | 920 | 877 |

Table 14 shows that the coating colour of the invention is more fluid than that of the prior art.

Obviously, numerous modifications and variations of the present invention are possible in light of the above teachings. It is therefore to be understood that within the scope of the appended claims, the invention may be practiced otherwise than as specifically described herein.

The present application is based on French Patent Application No. 97 09388, filed Jul. 18, 1997, and incorporated herein by reference in its entirety.

What is claimed is:

1. An aqueous suspension, comprising:
   water,
   at least one mineral substance, and
   a copolymer which comprises the following monomers in polymerized form:
   (a) at least one ethylenically unsaturated monomer having at least one carboxyl function, selected from the group consisting of acrylic acid, methacrylic acid, crotonic acids, isocrotonic acid, cinnamic acid, itaconic acid, fumaric acid, maleic acid, citraconic acid, maleic anhydride, the $C_1$ to $C_4$ monoesters of maleic acid, and the $C_1$ to $C_4$ monoesters of itaconic acid,
   (b) optionally, at least one ethylenically unsaturated monomer having at least one sulphonic function and/or phosphoric function, selected from the group consisting of acrylamido-methyl propane-sulphonic acid, sodium methallylsulphonate, vinyl sulphonic acids, the styrene sulphonic acids, ethylene glycol methacrylate phosphate, propylene glycol methacrylate phosphate, ethylene glycol acrylate phosphate, propylene glycol acrylate phosphate and their ethoxylates,
   (c) optionally, at least one ethylenically unsaturated monomer having no carboxyl function, selected from the group consisting of the esters of acrylic or methacrylic acids, acrylonitrile, methacrylonitrile, vinyl acetate, styrene, methylstyrene, diisobutylene, vinylpyrrolidone, vinylcaprolactam, unsaturated amides, the acrylic or methacrylic esters of glycol, methacrylamido-propyl-trimethyl-ammonium chloride or sulphate, the methacrylate of trimethyl-ammonium-ethyl chloride or sulphate and their acrylate and quarternized acrylamide counterparts, and dimethyldiallylammonium chloride, and
   (d) at least one ethylenically unsaturated oxyalkylated monomer terminating with a hydrophobic chain represented by the general formula (I):

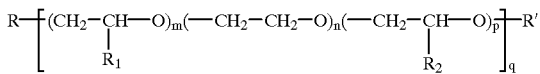

wherein
   m is at most 100,
   p is at most 100,
   n is at most 100,
   q is a number at least equal to 1 and such that $0 \leq q (n+m+p) \leq 100$.
   $R_1$ is hydrogen or a methyl or ethyl radical,
   $R_2$ is hydrogen or a methyl or ethyl radical,
   R is a polymerizable unsaturated radical derived from an acrylic, methacrylic, maleic, itaconic, crotonic, or vinylphthalic ester or an unsaturated urethane, wherein the unsaturated urethane is acrylurethane, methacrylurethane, α,α'dimethyl-m-isopropenyl-benzylurethane or allylurethane.
   R' is a hydrophobic radical, selected from the group consisting of a tristyrylphenyl group or a linear or branched alkyl, alkylalkyl, arylalkyl, aryl group having at least 8 carbon atoms, a dialkyl amine having at least 8 carbon atoms when R represents the unsaturated urethane, or R' is a tristyrylphenyl radical, a linear or branched alkyl alkylaryl, arylalkyl, aryl group having more than 30 carbon atoms or a dialkylamine having more than 22 carbon atoms when R represents polymerizable unsaturated radical derived from an acrylic, methacrylic, maleic, itaconic, crotonic, or vinylphthalic ester.
   wherein the sum of the weight percent of (a), (b), (c) and (d) in the copolymer is 100%, and
   the copolymer has a specific viscosity of at most 50.

2. The aqueous suspension of claim 1, wherein the copolymer contains:
   from 99 to 10% by weight of (a),
   from 0 to 50% by weight of (b),
   from 0% to 50% by weight of (c), and
   from 1% to 90% by weight of (d).

3. The aqueous suspension of claim 1, wherein the copolymer contains:
   from 97 to 50% by weight of (a),
   from 0 to 50% by weight of (b),
   from 0% to 50% by weight of (c), and
   from 3% to 50% by weight of (d).

4. The aqueous suspension of claim 1, wherein (c) comprises at least one monomer selected from the group consisting of methyl, ethyl, butyl, 2-ethyl-hexyl acrylates or methacrylates, acrylonitrile, methacrylonitrile, vinyl acetate, styrene, methylstyrene, diisobutylene, vinylpyrrolidone, vinylcaprolactam, acrylamide, methacrylamide, dimethylaminopropyl acrylamide or methacrylamide, the acrylic or methatharylic esters of glycol, methacrylamido-propyl-trimethyl-ammonium chloride or sulphate, the methacrylate of trimethyl-ammnonium-ethyl chloride or sulphate and their acrylate and quaternized acrylamide counterparts, and dimethyldiallylammonium chloride.

5. The aqueous suspension of claim 1, wherein R' is a branched alkyl group having 32 carbon atoms when R is a methacrylic ester.

6. The aqueous suspension of claim 1, wherein R' is a tristyrylphenyl group when R represents a methacrylic ester or a methacrylurethane.

7. The aqueous suspension of claim 1, wherein the copolymer is in acid form, or is partially or totally neutralized by one or more neutralizing agents having a monovalent function selected from the group consisting of alkaline cations, primary, secondary or tertiary aliphatic and/or cyclic amines, and/or one or more neutralizing agents having a polyvalent function selected from the group consisting of alkaline earth divalent cations, zinc, trivalent cations, or cations with a valency higher than 3.

8. The aqueous suspension of claim 7, wherein the monovalent alkaline cation is sodium, potassium or ammonium; the primary, secondary or tertiary aliphatic and/or cyclic amines are monostearylamine, distearylamine, monoethanolamine, diethanolamine, triethanolamine, monoethylamine, diethylamine, cyclohexylamine or methylcyclohexylamine; the alkaline earth divalent cations are calcium or magnesium; and the cations with a valency higher than 3 are aluminum.

9. The aqueous suspension of claim 1, comprising 0.05% to 5% by weight of the copolymer relative to the dry weight of the mineral substance.

10. The aqueous suspension of claim 1, wherein the mineral substance comprises a mineral substance with a charged hydrophilic surface.

11. The aqueous suspension of claim 10, wherein the mineral substance comprises a least one member selected from the group consisting of natural or synthetic calcium carbonates, dolomite, a kaolin and mixtures thereof.

12. The aqueous suspension of claim 10, wherein the mineral substance comprises a least one member selected from the group consisting of chalk, calcite and marble.

13. The aqueous suspension of claim 10, wherein the mineral substance comprises calcium carbonate and the calcium carbonate has a high yield stress and a low Brookfield viscosity for a concentration of dry substance of at least 45%.

14. The aqueous suspension of claim 1, wherein the mineral substance comprises a mineral substance with a hydrophobic surface.

15. The aqueous suspension of claim 14, wherein the mineral substance comprises at least one member selected from the group consisting of talc, mica and mixtures thereof.

16. The aqueous suspension of claim 15, wherein the talc or a mica has a high yield stress and a low Brookfield viscosity for a concentration of dry substance of at least 45%.

17. The aqueous suspension of claim 1, wherein the mineral substance comprises a mixture of mineral substances with a hydrophilic surface and/or a mixture of mineral substances with a hydrophobic surface.

18. The aqueous suspension of claim 17, wherein the mineral substance comprises a mixture of talc and calcium carbonate or a mixture of talc and kaolin.

19. The aqueous suspension of claim 1, wherein the mineral substance has a grain size such that 90% of the particles have a diameter of less than 2 micrometers.

20. The aqueous suspension of claim 1, comprising at least 60% by weight of the mineral substance.

21. A method of coating paper, comprising applying the aqueous suspension of claim 1 to a paper.

22. A method of making the aqueous suspension of claim 1, comprising combining the water, the mineral substance and the copolymer.

23. An aqueous suspension for coating paper, comprising:
(1) water,
(2) at least one mineral substance,
(3) a copolymer which comprises the following monomers in polymerized form:
  (a) at least one ethylenically unsaturated monomer having at least one carboxyl function, selected from the group consisting of acrylic acid, methacrylic acid, crotonic acid, isocrotonic acid, cinnamic acid, itaconic acid, fumaric acid, maleic acid, citraconic acid, maleic anhydride, the $C_1$ to $C_4$ monoesters of maleic acid, and the $C_1$ to $C_4$ monoesters of itaconic acid,
  (b) optionally, at least one ethylenically unsaturated monomer having at least one sulphonic function and/or phosphoric function, selected from the group consisting of acrylamido-methyl propane-sulphonic acid, sodium methallylsulphonate, vinyl sulphonic acids, the styrene sulphonic acids, ethylene glycol methacrylate phosphate, propylene glycol methacrylate phosphate, ethylene glycol acrylate phosphate, propylene glycol acrylate phosphate and their ethoxylates,
  (c) optionally, at least one ethylenically unsaturated monomer having no carboxyl function, selected from the group consisting of the esters of acrylic or methacrylic acids, acrylonitrile, methacrylonitrile, vinyl acetate, styrene, methylstyrene diisobutylene, vinylpyrrolidone, vinylcaprolactam, unsaturated amides, the acrylic or methacrylic esters of glycol, methacrylamido-propyl-trimethyl-ammonium chloride or sulphate, the methacrylate of trimethyl-ammonium-ethyl chloride or sulphate and their acrylate and quarternized acrylamide counterparts, and dimethyldiallylammonium chloride, and
  (d) at least one ethylenically unsaturated oxyalkylated monomer terminating with a hydrophobic chain represented by the general formula (I):

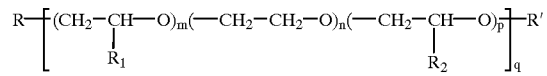

wherein m is at most 100, p is at most 100, n is at most 100, q is a number at least equal to 1 and such that $0 \leq q(n+m+p) \leq 100$, $R_1$ is hydrogen or a methyl or ethyl radical, $R_2$ is hydrogen or a methyl or ethyl radical, R is a polymerizable unsaturated radical derived from an acrylic, methacrylic, maleic, itaconic, crotonic, or vinylphthalic ester or an unsaturated urethane, wherein the unsaturated urethane is acrylurethane, methacrylurethane, α,α'dimethyl-m-isopropenyl-benzylurethane or allylurethane, R' is a hydrophobic radical, selected from the group consisting of a tristyrylphenyl group or a linear or branched alkyl, alkylaryl, arylalkyl, aryl group having at least 8 carbon atoms, a dialkyl amine having at least 8 carbon atoms when R represents the unsaturated urethane, or R' is a tristyrylphenyl radical, a linear or branched alkyl, alkylaryl, arylalkyl, aryl group having more than 30 carbon atoms or a dialkylamine having more than 22 carbon atoms when R represents polymerizable unsaturated radical derived from an acrylic, methacrylic, maleic, itaconic, crotonic, or vinylphthalic ester, wherein the sum of the weight percent of (a), (b), (c) and (d) in the copolymer is 100%, and the copolymer has a specific viscosity of at most 50, and (4) a binder.

24. The aqueous suspension of claim 23, wherein the binder comprises at least one member selected from the group consisting of a starch, carboxymethyl cellulose, polyvinyl alcohol and latex.

25. The aqueous suspension of claim 23, further comprising (5) at least one additive selected from the group consisting of rheology modifiers, organic fillers, antifoam agents, optical brighteners, biocides, lubricants and alkaline hydroxides.

26. A method of coating paper, comprising applying the aqueous suspension of claim 23 to a paper.

27. The aqueous suspension of claim 1, wherein the copolymer has a specific viscosity of at most 25.

28. The aqueous suspension of claim 23, wherein the copolymer has a specific viscosity of at most 25.

* * * * *

UNITED STATES PATENT AND TRADEMARK OFFICE
CERTIFICATE OF CORRECTION

PATENT NO. : 6,057,398
DATED : May 2, 2000
INVENTOR(S) : Rene Vinzenz Blum

It is certified that error appears in the above-identified patent and that said Letters Patent is hereby corrected as shown below:

Column 3,
Line 55, "tie" should read -- the --.

Column 5,
Line 41, "weights" should read -- weight --;
Line 46, "3." should read -- 3, --.

Column 6,
Line 24, "giver" should read -- given --.

Column 8,
Line 4, "Theological" should read -- rheological --;
Lines 9 and 17, "colours" should read -- colors --;
Lines 56 and 64, "neutralised" should read -- neutralized --;

Column 9,
Lines 2, 9, 17, 26, 33, 41, 49, 59, 66, "neutralised" should read -- neutralized --;
Line 8, "No 6" should read -- N° 6 --.

Column 10,
Lines 6, 13, 20, 28, 36, 44, 52, 60, "neutralised" should read -- neutralized --.

Column 11,
Lines 3, 10, 16, 24, 30, "neutralised" should read -- neutralized --;
Table 1, line 47, "1290" should read -- 1280;
Table 1, line 51, "11" should read -- 12 --.

Column 12,
Lines 33 and 34, "mpa.s" should read -- mPa.s --.

Column 13,
Lines 3, 10, 17, 25, 61, "neutralised" should read -- neutralized --.

Column 14,
Lines 11, 19, 28, 49, 57, 65, "neutralisation" should read -- neutralization --.

UNITED STATES PATENT AND TRADEMARK OFFICE
CERTIFICATE OF CORRECTION

PATENT NO. : 6,057,398
DATED : May 2, 2000
INVENTOR(S) : Rene Vinzenz Blum

It is certified that error appears in the above-identified patent and that said Letters Patent is hereby corrected as shown below:

Column 15,
Lines 7, 17, 25, 33, 40, 48, 56, 65, "neutralisation" should read -- neutralization --;
Line 27, "No 46" should read -- N° 46 --.

Column 16,
Lines 8, 17, 26, 35, 46, 54, 61, "neutralisation" should read -- neutralization --.

Column 17,
Line 3, "neutralisation" should read -- neutralization --;
Lines 11, 19, 27, 35, "neutralised" should read -- neutralized --;
Lines 42-43 and 49-50, "neu-tralised" should read -- neutralized --;

Column 18,
Line 65, "neutralisation" should read -- neutralization --.

Column 19,
Lines 6, 27, 36, 45, "neutralisation" should read -- neutralization --;
Line 8, after "of:" delete "42", Column 20,
Lines 21 and 27, "neutralised" should read -- neutralized --;
Lines 33-34, 41-42, 48-49, 54-55, 61-62, "neu-tralised" should read -- neutralized --;
Line 56, "weight." should read -- weight --.

Column 21,
Lines 2-3, 11-12, 19-20, 27-28, 35-36, 42-43, 49-50, 56-57, 64-65, "neu-tralised" should read -- neutralized --.

Column 22,
Lines 4-5, 11-12, 62-63, "neu-tralised" should read -- neutralized --.

Column 23,
Lines 2-3, "neu-tralised" should read -- neutralized --;
Line 47, "neutralisation" should read -- neutralization --.

UNITED STATES PATENT AND TRADEMARK OFFICE
CERTIFICATE OF CORRECTION

PATENT NO. : 6,057,398
DATED : May 2, 2000
INVENTOR(S) : Rene Vinzenz Blum

It is certified that error appears in the above-identified patent and that said Letters Patent is hereby corrected as shown below:

Column 24,
Line 9, "cry" should read -- dry --;
Lines 21, 62, "neutralisation" should read -- neutralization --.

Column 25,
Line 15, "mpa.s" should read -- mPa.s --;
Line 36, "neutralisation" should read -- neutralization --.

Column 26,
Line 55, "neutralisation" should read -- neutralization --.

Column 27,
Line 10, "mpa.s" should read -- mPa.s --;
Line 32, "neutralisation" should read -- neutralization --.

Column 28,
Line 54, "neutralisation" should read -- neutralization --.

Column 29,
Lines 10 and 55, "mpa.s" should read -- mPa.s --

Column 30,
Line 9, "neutralisation" should read -- neutralization --;
Line 32, "mpa.s." should read -- mPa.s --;
Line 60, "sane" should read -- same --.

Column 31,
Line 30, "neutralisation" should read -- neutralization --.

Column 32,
Line 4, "this" should read -- This --;
Lines 31-32, 39-40, "neu-tralised" should read -- neutralized --.

Column 34,
Line 27, "Theological" should read -- rheological --;
Line 49, "neutralised" should read - neutralized --.

UNITED STATES PATENT AND TRADEMARK OFFICE
CERTIFICATE OF CORRECTION

PATENT NO. : 6,057,398
DATED : May 2, 2000
INVENTOR(S) : Rene Vinzenz Blum

It is certified that error appears in the above-identified patent and that said Letters Patent is hereby corrected as shown below:

Column 36,
Line 58, "Theological" should read -- rheological --.

Column 37,
Lines 3, 14, "neutralised" should read -- neutralized --;
Line 41, "Theological" should read -- rheological --.

Column 38,
Lines 21, 24, 36, 58, "colour" should read -- color --;
Line 31, "0.5part" should read -- 0.5 part --.
Line 22, "colours" should read -- colors --.

Column 39,
Line 11, "acids" should read -- acid --.

Signed and Sealed this

Fourth Day of September, 2001

*Attest:*

Nicholas P. Godici

*Attesting Officer*

NICHOLAS P. GODICI
*Acting Director of the United States Patent and Trademark Office*